(12) United States Patent
Saeki et al.

(10) Patent No.: US 11,171,386 B2
(45) Date of Patent: Nov. 9, 2021

(54) INORGANIC PARTICLES FOR NONAQUEOUS ELECTROLYTE BATTERY

(71) Applicant: Asahi Kasei Kabushiki Kaisha, Tokyo (JP)

(72) Inventors: Hiroyuki Saeki, Tokyo (JP); Nobuhiro Ito, Tokyo (JP); Kunio Matsui, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 97 days.

(21) Appl. No.: 16/465,660

(22) PCT Filed: Dec. 1, 2017

(86) PCT No.: PCT/JP2017/043362
§ 371 (c)(1),
(2) Date: May 31, 2019

(87) PCT Pub. No.: WO2018/101474
PCT Pub. Date: Jun. 7, 2018

(65) Prior Publication Data
US 2019/0305278 A1    Oct. 3, 2019

(30) Foreign Application Priority Data

Dec. 2, 2016  (JP) .............................. JP2016-235065
Jun. 16, 2017 (JP) .............................. JP2017-118395
Aug. 30, 2017 (JP) .............................. JP2017-165962

(51) Int. Cl.
*H01M 50/409*    (2021.01)
*H01M 10/0525*   (2010.01)
(Continued)

(52) U.S. Cl.
CPC ......... *H01M 50/409* (2021.01); *B01J 20/041* (2013.01); *B01J 20/08* (2013.01);
(Continued)

(58) Field of Classification Search
CPC .. H01M 4/62; H01M 10/052; H01M 10/0525; H01M 10/058; H01M 10/0585;
(Continued)

(56) References Cited

U.S. PATENT DOCUMENTS

| 6,730,440 B1    | 5/2004  | Bauer et al.  |
| 2016/0344009 A1 | 11/2016 | Suzuki et al. |
| 2019/0067748 A1 | 2/2019  | Saeki et al.  |

FOREIGN PATENT DOCUMENTS

| JP | 2002-541647 A | 12/2002 |
| JP | 2006-282446 A | 10/2006 |

(Continued)

OTHER PUBLICATIONS

International Search Report issued in corresponding International Patent Application No. PCT/JP2017/043362 dated Feb. 13, 2018.
(Continued)

*Primary Examiner* — Gregg Cantelmo
(74) *Attorney, Agent, or Firm* — Morgan, Lewis & Bockius LLP

(57) ABSTRACT

The purpose of the present invention is to provide a nonaqueous electrolyte battery having excellent lifespan characteristics and/or excellent safety, which are essential in practice. The basic inorganic particles for a nonaqueous electrolyte battery according to the present invention include basic inorganic particles, wherein a hydrophilicity parameter A for the basic inorganic particles satisfies the expression: $0.45 \leq A(BET1/BET2) \leq 2.0$. In the expression, BET1 represents the specific surface area of the basic inorganic particles calculated from an adsorption isotherm which is measured through adsorption of water vapor to the basic inorganic particles by a BET method. BET2 represents the specific surface area of the basic inorganic particles calculated from an adsorption isotherm which is measured through adsorp-
(Continued)

tion of nitrogen to the basic inorganic particles by a BET method.

23 Claims, 1 Drawing Sheet

(51) Int. Cl.
| | |
|---|---|
| *H01M 10/058* | (2010.01) |
| *H01M 10/0587* | (2010.01) |
| *H01M 10/0585* | (2010.01) |
| *H01M 4/62* | (2006.01) |
| *H01M 10/42* | (2006.01) |
| *H01M 10/052* | (2010.01) |
| *H01M 10/0566* | (2010.01) |
| *H01M 50/446* | (2021.01) |
| *H01M 10/52* | (2006.01) |
| *H01M 50/449* | (2021.01) |
| *H01B 1/08* | (2006.01) |
| *H01M 50/411* | (2021.01) |
| *H01M 50/489* | (2021.01) |
| *B01J 20/04* | (2006.01) |
| *H01M 50/417* | (2021.01) |
| *H01M 50/434* | (2021.01) |
| *B01J 20/08* | (2006.01) |
| *C09D 1/00* | (2006.01) |
| *H01M 50/451* | (2021.01) |
| *H01M 50/431* | (2021.01) |
| *H01M 50/443* | (2021.01) |
| *C01F 11/12* | (2006.01) |
| *H01M 50/423* | (2021.01) |
| *H01M 50/414* | (2021.01) |
| *H01M 50/457* | (2021.01) |

(52) U.S. Cl.
CPC ............... *C09D 1/00* (2013.01); *H01B 1/08* (2013.01); *H01M 4/62* (2013.01); *H01M 10/052* (2013.01); *H01M 10/058* (2013.01); *H01M 10/0525* (2013.01); *H01M 10/0566* (2013.01); *H01M 10/0585* (2013.01); *H01M 10/0587* (2013.01); *H01M 10/4235* (2013.01); *H01M 10/52* (2013.01); *H01M 50/411* (2021.01); *H01M 50/417* (2021.01); *H01M 50/431* (2021.01); *H01M 50/434* (2021.01); *H01M 50/443* (2021.01); *H01M 50/446* (2021.01); *H01M 50/449* (2021.01); *H01M 50/451* (2021.01); *H01M 50/489* (2021.01); *C01F 11/12* (2013.01); *C01P 2002/72* (2013.01); *H01M 50/414* (2021.01); *H01M 50/423* (2021.01); *H01M 50/457* (2021.01)

(58) Field of Classification Search
CPC ......... H01M 10/0587; H01M 10/4235; H01M 10/52; H01M 50/409; H01M 50/411; H01M 50/417; H01M 50/431; H01M 50/434; H01M 50/443; H01M 50/446; H01M 50/449; H01M 50/451; H01M 50/489; B01J 20/041; B01J 20/08; C09D 1/00; H01B 1/08
See application file for complete search history.

(56) References Cited

FOREIGN PATENT DOCUMENTS

| | | |
|---|---|---|
| JP | 2008-088284 A | 4/2008 |
| JP | 4625141 B | 2/2011 |
| JP | 4685974 B | 5/2011 |
| JP | 2011-124202 A | 6/2011 |
| JP | 2013-114764 A | 6/2013 |
| JP | 2014-022329 A | 2/2014 |
| JP | 2015-228352 A | 12/2015 |
| KR | 10-2004-0005664 A | 1/2004 |
| WO | 00/62364 A1 | 10/2000 |
| WO | 2012/099149 A1 | 7/2012 |
| WO | 2015/111230 A1 | 7/2015 |
| WO | 2015/154320 A1 | 10/2015 |
| WO | 2017/146237 A1 | 8/2017 |

OTHER PUBLICATIONS

International Preliminary Report on Patentability and Written Opinion issued in corresponding International Patent Application No. PCT/JP2017/043362 dated Jun. 4, 2019.
Office Action issued in corresponding European Patent Application No. 17875979.1 dated Nov. 25, 2019.
Supplementary European Search Report issued in European Patent Application No. 17875979.1 dated Oct. 29, 2019.
Office Action issued in corresponding European Patent Application No. 17875979.1 dated Sep. 15, 2021.
Xia et al., "Preparation and the phase transformation behavior of amorphous mesoporous calcium silicate," Microporous and Mesoporous Materials, 108: 345-351 (2008).

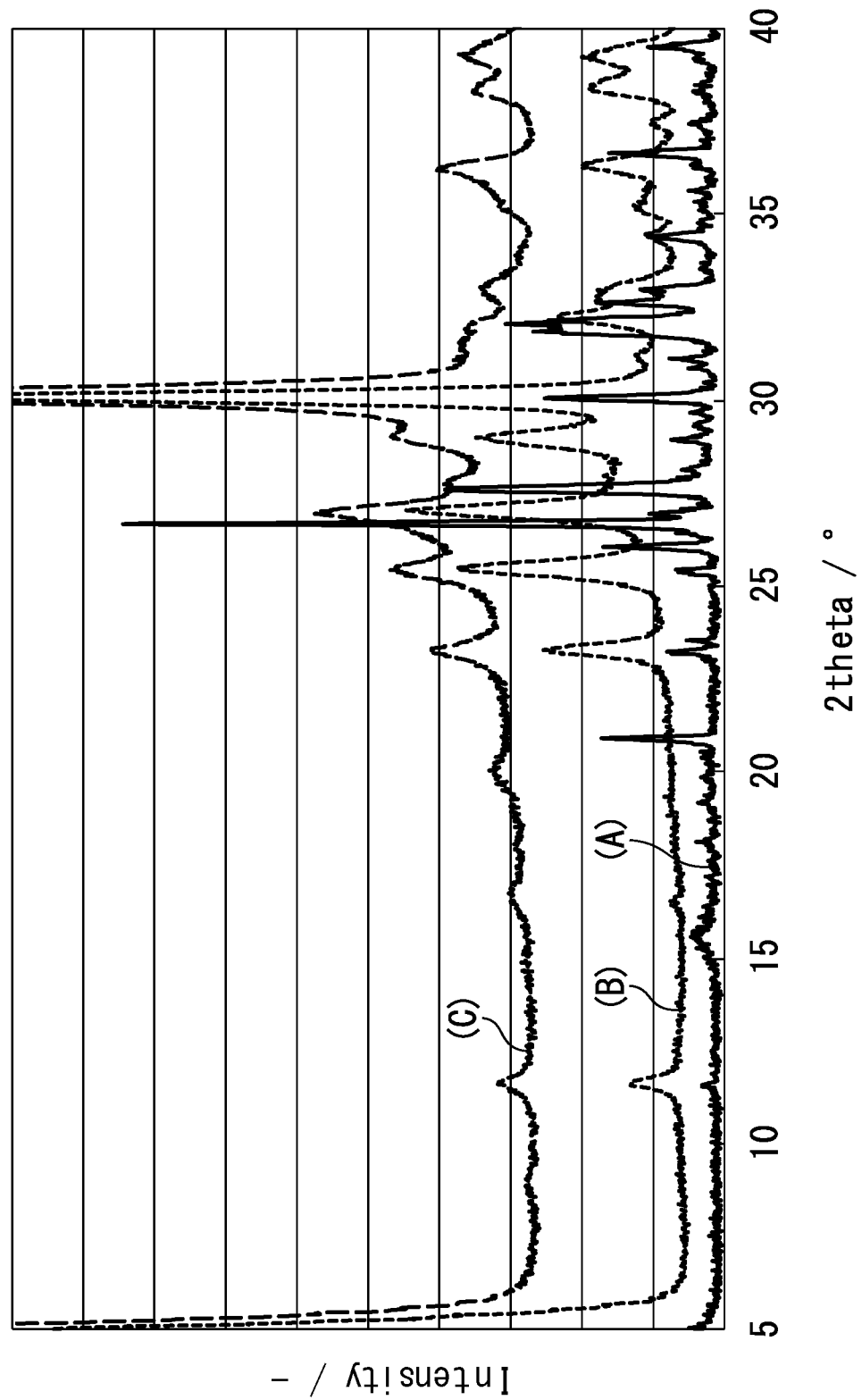

INORGANIC PARTICLES FOR NONAQUEOUS ELECTROLYTE BATTERY

FIELD

The present invention relates to basic inorganic particles for a nonaqueous electrolyte battery superior in life characteristics and safety of the nonaqueous electrolyte battery.

BACKGROUND

Due to the development of electronic technology, or the growing interest in environmental technology in recent years, various electrochemical devices are used. Particularly, requests for energy saving, and expectations for electrochemical devices that can contribute to the above have been increasing more and more.

A lithium ion secondary battery which is a representative example of a power storage device, and also a representative example of a nonaqueous electrolyte battery, has been conventionally used mainly as a power source for a miniature device, but in recent years, it has drawn attention as a power source for a hybrid vehicle or an electric vehicle.

With respect to a lithium ion secondary battery, increase in energy density is advancing along with enhancement of device performances, and reliability is becoming more important. In particular, in the case of a medium- or large-sized lithium-ion secondary battery such as an automotive onboard power source, it is essential to ensure higher reliability than in the case of miniature devices. Furthermore, as the automotive onboard power source, a lithium ion secondary battery capable of maintaining charge/discharge capacitance for a long period of time in accordance with a product cycle, is required.

In a lithium ion secondary battery, a lithium (Li) ion moves between a positive electrode and a negative electrode to carry out charge and discharge. However, it has been known that, if a trace amount of metal ions other than a Li ion is present in the battery, it may deposit on the negative electrode surface to cause reduction in the battery life, or the deposited metal may break a separator and reach the positive electrode to cause a short circuit or deterioration of safety. Such metal ions are originated from impurities in a battery constituent material, and additionally some are derived by dissolution of a metal included in a positive electrode active material into a nonaqueous electrolyte as the result of a side reaction in the battery. For example, hydrofluoric acid (HF) is generated by the decomposition reaction of the nonaqueous electrolyte, etc., and the metal contained in the positive electrode active material is eluted by HF and is deposited at the negative electrode through the separator, resulting in the reduction in safety and a battery life. Furthermore, it is pointed out that this metal elution is more pronounced when the battery is exposed to elevated temperatures. Therefore, various materials for removing HF have been investigated (for example, Patent Literatures 1 and 2).

When investigating the material for removing HF, a method for placing the material in a lithium ion battery and inspecting it, is generally applied (for example, Patent Literature 3). However, the battery cell assembling process is complicated, and it takes time to search for materials. On the other hand, a method has been proposed which uses a hydrochloric acid aqueous solution to evaluate whether acid can be captured or not without assembling a cell (for example, Patent Literature 4). However, this method is based on an evaluation in an aqueous solution system. In addition, because it is evaluated using hydrochloric acid, the state inside a battery can hardly be reproduced. Therefore, it is not clear as to whether or not the material actually functions effectively in a lithium ion battery, as long as a cell is actually assembled.

CITATION LIST

Patent Literature

[Patent Literature 1] Japanese Unexamined Patent Publication (Kokai) No. 2008-88284
[Patent Literature 2] Japanese Patent Publication No. 4685974
[Patent Literature 3] Japanese Patent Publication No. 4625141
[Patent Literature 4] Japanese Unexamined Patent Publication (Kokai) No. 2014-22329

SUMMARY

Technical Problem

Namely, with known HF scavengers, life characteristics or safety which can withstand practical use have not been obtained. Moreover, an efficient evaluation method for the HF scavenger has not been established. Therefore, an object of the present invention is to provide a nonaqueous electrolyte battery superior in life characteristics and safety and an efficient evaluation method for the HF scavenger.

Solution to Problem

The present inventors have found an efficient evaluation method of a HF scavenger and found to be able to provide inorganic particles for a nonaqueous electrolyte battery extremely excellent in removing HF by incorporating into a nonaqueous electrolyte battery specific basic inorganic particles having a physical property that is controlled in an appropriate range. Moreover, the present inventors have found by using the inorganic particles for a nonaqueous electrolyte battery of the present invention that it is possible to realize a nonaqueous electrolyte battery capable of significantly improving life characteristics and safety and further preventing battery swelling to complete the invention.

Namely, the present invention is as follows.

[1]
Inorganic particles for a nonaqueous electrolyte battery, comprising basic inorganic particles, wherein a hydrophilic parameter A of the basic inorganic particles satisfies $0.45 \leq A$ (BET1/BET2)$\leq 2.0$, where BET1 is a specific surface area of the basic inorganic particles calculated by an adsorption isotherm measured by adsorbing water vapor to the basic inorganic particles according to a BET method, and BET2 is a specific surface area of the basic inorganic particles calculated by an adsorption isotherm measured by adsorbing nitrogen to the basic inorganic particles according to a BET method.

[2]
The inorganic particles for a nonaqueous electrolyte battery according to [1], wherein a HF concentration decreases to less than 90% of an initial HF concentration in 5 minutes at 23° C. after adding the basic inorganic particles into 100 parts by weight of a cyclic and/or a linear carbonate solution having the HF concentration of 10 to 10,000 ppm and containing 0.1 to 6.0 mol/L of $LiPF_6$ such that an amount of the basic inorganic particles is [HF concentration (ppm)]/100 parts by weight.

[3]
The inorganic particles for a nonaqueous electrolyte battery according to [1] or [2], wherein the basic inorganic particles comprise an element such as Be, Mg, or an element belonging to an alkaline-earth metal.

[4]
The inorganic particles for a nonaqueous electrolyte battery according to any one of [1] to [3], wherein the basic inorganic particles further comprise an element belonging to a typical metal or a transition metal.

[5]
The inorganic particles for a nonaqueous electrolyte battery according to any one of [1] to [4], further comprising a non-basic inorganic metal.

[6]
The inorganic particles for a nonaqueous electrolyte battery according to [5], wherein the non-basic inorganic particles are an anion adsorbent and/or a cation adsorbent.

[7]
The inorganic particles for a nonaqueous electrolyte battery according to [6], wherein the anion adsorbent is layered double hydroxide (Mg—Al type, Mg—Fe type, Ni—Fe type, Li—Al type), layered double a hydroxide-alumina silica gel complex, boehmite, alumina, zinc oxide, lead oxide, iron oxide, iron oxyhydroxide, hematite, bismuth oxide, tin oxide, titanium oxide, and zirconium oxide, and the cation adsorbent is zirconium phosphate, titanium phosphate, apatite, titanate, niobate, and niobate•titanate.

[8]
The inorganic particles for a nonaqueous electrolyte battery according to any one of [1] to [7], wherein the basic inorganic particles are calcium silicate.

[9]
The inorganic particles for a nonaqueous electrolyte battery according to [8], wherein the calcium silicate is wollastonite or xonotlite.

[10]
A nonaqueous electrolyte battery comprising a positive electrode, a negative electrode, a separator, a nonaqueous electrolytic solution, and an outer package, wherein the battery comprises the inorganic particles for a nonaqueous electrolyte battery according to any one of [1] to [9] in the battery.

[11]
The nonaqueous electrolyte battery according to [10], wherein an inorganic particle-containing layer containing the inorganic particles for a nonaqueous electrolyte battery is present between the positive electrode and the negative electrode.

[12]
A separator for a nonaqueous electrolyte battery comprising the inorganic particles for a nonaqueous electrolyte battery according to any one of [1] to [9].

[13]
A separator for a nonaqueous electrolyte battery comprising an inorganic particle-containing layer containing the inorganic particles for a nonaqueous electrolyte battery according to any one of [1] to [9].

[14]
A separator for a nonaqueous electrolyte battery comprising an inorganic particle-containing layer containing the inorganic particles for a nonaqueous electrolyte battery according to any one of [1] to [9] at least on one side of the separator.

[15]
The separator for a nonaqueous electrolyte battery according to [14], further comprising an aqueous polymer in the inorganic particle-containing layer.

[16]
A paint for a nonaqueous electrolyte battery, comprising the inorganic particles for a nonaqueous electrolyte battery according to any one of [1] to [9].

[17]
A resin solid material for a nonaqueous electrolyte battery, comprising the inorganic particles for a nonaqueous electrolyte battery according to any one of [1] to [9] and a resin.

[18]
A lithium ion secondary battery comprising a laminated body or a roll of the laminated body, and a nonaqueous electrolyte, wherein a positive electrode, an inorganic particle-containing layer containing the inorganic particles for a nonaqueous electrolyte battery according to any one of [1] to [9], a separator, and a negative electrode are laminated in this order.

[19]
The separator for a nonaqueous electrolyte battery according to any one of [12] to [15], wherein a HF concentration decreases to less than 90% of an initial HF concentration in 5 minutes at 23° C. after putting the separator for a nonaqueous electrolyte battery into 100 parts by weight of a cyclic and/or a linear carbonate solution having a HF concentration of 10 to 10,000 ppm and containing 0.1 to 6.0 mol/L of LiPF6 such that an amount of the basic inorganic particles for a nonaqueous electrolyte solution is [HF concentration (ppm)]/100 parts by weight.

[20]
The separator for a nonaqueous electrolyte battery according to any one of [12] to [15], wherein a HF concentration decreases to less than 90% of an initial HF concentration when 10 ml of a nonaqueous electrolyte solution passed through the separator at a speed of 250,000 ml/h/m$^2$, such that an amount of the basic inorganic particles contained in the separator is [HF concentration (ppm)]/100 parts by weight with respect to 100 parts by weight of the nonaqueous electrolyte solution, wherein the nonaqueous electrolyte solution is a cyclic and/or a linear carbonate solution having a HF concentration of 10 to 10,000 ppm and containing 0.1 to 6.0 mol/L of $LiPF_6$.

Advantageous Effects of Invention

According to the present invention, it is possible to provide a nonaqueous electrolyte battery superior in life characteristics and safety and an efficient evaluation method for a HF scavenger.

BRIEF DESCRIPTION OF DRAWINGS

In the FIGURE, (A) is a diagram showing a diffraction pattern of the inorganic particles produced in Example 1, obtained by X-ray diffraction measurement, and (B) and (C) are the diffraction patterns in. Examples 2 and 3, respectively.

DESCRIPTION OF EMBODIMENTS

Embodiments for implementing the present inventions (hereinafter simply referred to as "embodiments") will be described below in detail. The following embodiments are just examples for explaining the present invention and are not intended to limit the present invention to the following contents. The present invention may be implemented with appropriate modifications within the scope of its gist.

[Inorganic Particle for Nonaqueous Electrolyte Battery and Nonaqueous Electrolyte Battery Comprising Particle Thereof]

A nonaqueous electrolyte battery according to the present embodiment is provided with battery constituent materials, such as a positive electrode, a negative electrode, a separator, a nonaqueous electrolytic solution, and an outer package, and at least one of the battery constituent materials comprises inorganic particles for a nonaqueous electrolyte battery comprising basic inorganic particles capable of improving life characteristics and safety of the nonaqueous electrolyte battery.

With respect to the battery constituent materials, for example, aluminum, etc. may be used for a packaging material or the outer package, nickel, cobalt, manganese, iron, zinc, copper, aluminum, etc. may be used for a positive electrode active material, and copper, aluminum, etc. may be used for a current collector foil. As described previously, there is the case in which a metal contained in the positive electrode active material or current collector foil is eluted due to a side reaction inside a battery, causing a generation of hydrofluoric acid (HF). These metals elute as metal ions when the metals contact with HF. The eluted ions are reduced and precipitated at the negative electrode to form a Li-containing compound which causes reduction in capacity, and as a result a problem of significantly reducing life characteristics of the battery arises.

On the other hand, by comprising the basic inorganic particles of the present embodiment, HF generated in the battery can be effectively removed, the elution of metal ions can be suppressed, and the life characteristics of the battery can be improved. Furthermore, it also becomes possible to prevent the deposition of the metal in the negative electrode, which renders it possible to suppress a short circuit, and as a result contribute to the improvement of safety.

[Basic Inorganic Particles]

The inorganic particles according to the present embodiment exhibit basicity. The term "basicity" as used herein refers to that exhibiting a prescribed property obtained by the following two measurement methods. One of them is a method in which pH exhibits basicity when the inorganic particles are dispersed in water. The other is a method in which when a Hammett indicator is used, the inorganic particles show discoloration with an indicator of pKa of 26 or greater.

Although the detailed measuring method of basicity will be described below, one of the determination methods of basicity/non-basicity of the inorganic particles is exemplified here. First, a method for measuring pH when the inorganic particles is dispersed in water will be described. 10% by weight of the inorganic particles are added to deionized water followed by sufficient dispersion combined with stirring and means of ultrasonic waves and a ball mill. The state of dispersion is preferably measured and confirmed using a particle size distribution analyzer, etc. Then the temperature of the dispersion is adjusted to 25° C. in a thermostatic bath kept at 25° C.

The pH is measured and then confirmed to be 8 or greater using a Merck pH stick pH 0-14. After that, a composite electrode for pH measurement is connected to a pH meter and power is turned on. A saturated aqueous potassium chloride solution (3.33 mol/L) is used as a pH electrode internal liquid. Next, each of 100 ml beakers is filled with a pH 4.01 standard solution (phthalate standard solution), pH 6.86 standard solution (neutral phosphate standard solution), and pH 9.18 standard solution (borate standard solution), respectively, and each beaker is immersed in a thermostatic bath at 25° C. for 30 minutes. The pH measurement electrode is immersed in the standard solutions adjusted to the constant temperature for 3 minutes, and calibration operation is performed in the order of pH 6.86, pH 9.18, and pH 4.01.

For example, a pH meter manufactured by HORIBA, Ltd.; a pH/ion meter D-51, a composite electrode for pH measurement manufactured by HORIBA, Ltd.; a GRT composite electrode, respectively can suitably be used.

After carrying out the calibration operation, the pH measurement electrode is immersed for 3 minutes in water dispersion liquid containing the inorganic particles, whose temperature is adjusted to the aforementioned constant temperature, and then pH is measured.

When the pH is 7.5 or greater, the inorganic particles are considered to be basic inorganic particles. Conversely, when the pH is less than 7.5, the inorganic particles are non-basic inorganic particles.

Next, a method for determining basicity using a Hammett indicator will be described. As a Hammett reagent, a set of indicators having definite pKa values is used. The Hammett reagent is adsorbed on the solid surface and the color change is observed. In the adsorption operation, a sample is placed in benzene or cyclohexane, and an indicator solution is added thereto. The sample may be contacted with vapor of the indicator in a vacuum. In the case of a solid base, an acid type indicator is used. Since the pKa value of each of the indicators is fixed, when an indicator having pKa of 26 or greater shows color change, the sample is considered as basic.

When non-basic particles are mixed and it is difficult to measure them with a pH or a Hammett indicator as in the case that each particle is dispersed solely in water, the aforementioned basicity may be judged in the mixed state of the particles. Moreover, the composition of the particles may be specified using X-ray diffraction measurement, etc., and the result as to whether they are basic inorganic particles or not may be comprehensively utilized and judged.

The hydrophilic parameter A=BET1/BET2 of the basic inorganic particles of the present embodiment is preferably 0.45 or greater and 2.0 or less, where BET1 is a specific surface area of the basic inorganic particles calculated by an adsorption isotherm measured by adsorbing water vapor to the basic inorganic particles according to a BET method, and BET2 is a specific surface area of the basic inorganic particles calculated by an adsorption isotherm measured by adsorbing nitrogen to the basic inorganic particles according to a BET method. More preferably, the hydrophilic parameter A is 0.5 or more and 2.0 or less, more preferably 0.65 or more and 2.0 or less, more preferably 1.0 or more and 2.0 or less, and still more preferably 1.0 or more and 1.8 or less. When the hydrophilic parameter A is 0.45 or more and 2.0 or less, desirable HF adsorption performance can be obtained.

The BET 1 is a value reflecting a chemical adsorption amount of water on the inorganic particles. Specifically, the water vapor is adsorbed to the inorganic particles by supplying the water vapor to the inorganic particles at a prescribed temperature while changing the partial pressure thereof. An adsorption isotherm is obtained by measuring the amount of adsorption of water vapor to the inorganic particles during this operation. The adsorption isotherm is considered to reflect the chemical adsorption amount of water on the inorganic particles and is considered to include information on hydrophilicity of the inorganic particles.

BET 2 is a specific surface area of the inorganic particles. Specifically, nitrogen is adsorbed to the inorganic particles by supplying nitrogen to the inorganic particles at a prescribed temperature while changing its partial pressure. An adsorption isotherm is obtained by measuring the amount of adsorption of nitrogen to the inorganic particles during this operation. By dividing BET 1 by BET 2, a value reflecting the chemical adsorption amount of water per unit specific surface area of the inorganic particles can be obtained. It means that the larger the value of the hydrophilic parameter A becomes, the greater the hydrophilicity of the inorganic particles surface is.

The inorganic particles of the present embodiment are basic particles, and a material thereof is not restricted as long as the hydrophilic parameter A (=BET1/BET2) satisfies 0.45 or more and 2.0 or less. When the value of the aforementioned hydrophilic parameter A (=BET1/BET2) is the lower limit or greater, the inorganic particles exhibit a good interaction with HF, and HF can be adsorbed effectively at the surface of the particle. Moreover, when the aforementioned A is the upper limit or less, battery swelling can be suppressed.

As described below, when the inorganic particles for a nonaqueous electrolyte battery of this embodiment comprise non-basic inorganic particles other than the basic inorganic particles and it is difficult to evaluate the hydrophilic parameter of the basic inorganic particles solely, the aforementioned hydrophilic parameter may be calculated in the mixed state of the particles. Even though the hydrophilic parameter in the mixed state is calculated, hydrophilicity in the vicinity of the particle can be evaluated, and there is no problem in judging adsorptivity of the metal ions.

Although the reason why the battery swelling can be suppressed is unknown, the amount of water adsorbed or hydrated to the basic inorganic particles is conjectured to be controlled to the allowable range or less when the hydrophilic parameter is 2.0 or less.

As the above basic inorganic particles, particles being basic in nature is preferable, and examples thereof include, however not limited thereto, at least one substance selected from the group consisting of sodium oxide, potassium oxide, magnesium oxide, calcium oxide, barium oxide, lanthanum oxide, cerium oxide, strontium oxide, vanadium oxide, $SiO_2$—MgO (magnesium silicate), $SiO_2$—CaO (calcium silicate), hydrotalcite, sodium carbonate, potassium carbonate, magnesium carbonate, calcium carbonate, barium carbonate, lanthanum carbonate, cerium carbonate, basic titanate, basic silicotitanate, basic apatite, n-alumina, basic tungstate, basic molybdate, basic copper acetate, and basic lead sulfate.

Among such basic inorganic particles, in order to effectively remove HF, it is preferable to contain an element that forms stable fluoride among metal elements, and specific elements include Ti, Zr, Hf, Sc, Y, lanthanoid, Be, Mg, Ca, Sr, Al, and Ba.

More specifically, as a more preferable basic inorganic particles used in the present embodiment, magnesium oxide, calcium oxide, barium oxide, lanthanum oxide, cerium oxide, strontium oxide, $SiO_2$—MgO (magnesium silicate), $SiO_2$—CaO (calcium silicate), hydrotalcite, magnesium carbonate, calcium carbonate, barium carbonate, lanthanum carbonate, cerium carbonate, basic silicotitanate, basic apatite, n-alumina and basic titanate, are included.

At least one element selected from the group consisting of Ti, Zr, Hf, Sc, Y, lanthanoid, Be, Mg, Ca, Sr, Al, and Ba, is preferably contained in a ratio of 0.05 to 0.6 with respect to 1 mole of the basic inorganic particles. The lower limit thereof is more preferably 0.075 or more, and still more preferably 0.1 or more. The upper limit thereof is preferably 0.55 or less, and more preferably 0.5 or less.

Among the above elements, it is preferable that the metal ions diffused from the basic inorganic particles are stable. Namely, among the above elements, an element belonging to an alkali metal, Be or Mg, or an alkaline-earth metal is preferably contained, an element belonging to Be, Mg or an alkaline-earth metal is more preferably contained, and at least one element selected from the group consisting of Mg, Ca, Sr and Ba is most preferably contained. Stability of such metal ions enables effective removal of HF diffused in an electrolyte solution. Further, since the reductive deposition does not occur again in the negative electrode, nothing affects the battery characteristics, etc. Moreover, from the viewpoint of stability of the particles, it is preferable to contain an element belonging to Be, Mg or an alkaline-earth metal. Examples of the material that satisfies these requirements include calcium oxide, barium oxide, $SiO_2$— MgO (magnesium silicate), $SiO_2$— CaO (calcium silicate), hydrotalcite, magnesium carbonate, calcium carbonate, barium carbonate, basic silicotitanate, basic apatite, and basic titanate.

In addition to the above elements contained, it is preferable to further contain a transition metal or a typical metal from the viewpoint of stabilizing the particles. The transition metal or typical metal is preferably contained in a proportion of 0.01% by mole to 40% by mole with respect to 1 mole of the basic inorganic particles, and the lower limit is more preferably 0.05% by mole and furthermore preferably 0.10% by mole. Moreover, the upper limit is more preferably 35% by mole, and furthermore preferably 30% by mole. The element as the typical metal includes Al, Zn, Ga, Cd, In, Sn, Hg, TL, Pb, and Bi. Further, the element as the transition metal includes Ti, V, Cr, Mn, Fe, Co, Ni, Cu, Zr, Nb, Mo, Tc, Ru, Rh, Pd, Ag, Hf, Ta, W, Re, Os, Ir, Pt, and Au.

Among the transition metal or typical metal, Al, Fe, Mn, Nb, Ti, Zr, Hf and Zn are preferable, and Al, Fe, Mn, Nb, Ti and Zn are more preferable from the viewpoint of particle stability. Al and/or Fe are particularly preferable.

The ratio of these metal elements can preferably be confirmed by high frequency inductively coupled plasma (ICP) emission spectrometry, etc., which are an emission spectrometry using high frequency inductively coupled plasma (ICP) as a light source. When particles are mixed and separation of the composition is difficult, the composition of the particles contained can be comprehensively evaluated using X-ray diffraction measurement, time-of-flight secondary ion mass spectrometry, etc. In order to more directly confirm the presence or absence of a specific element in the particles, SEM-EDX may also be used.

The basic apatite according to the present embodiment refers to a material showing basicity among materials belonging to the apatite super group. The apatite is not particularly restricted, however, examples thereof include elestadite $(Ca_{10}(SiO_4)_{1.5}(SO_4)_{1.5}(OH))$, hydroxyapatite $(Ca_{10}(PO_4)_6(OH)_2)$, also referred to as "calcium hydroxyphosphate"), fluoroapatite $(Ca_{10}(PO_4)_6F_2)$, and chlorine apatite $(Ca_{10}(PO_4)_6Cl_2)$. Among them, for example, hydroxyapatite is used.

The phosphate ion $(PO_4^{3-})$ site can be substituted with element groups such as a sulfate ion $(SO_4^{2-})$, a carbonate ion $(CO_3^{2-})$, a hydrogen phosphate ion $(HPO_4^{2-})$, an arsenate ion $(AsO_4^{3-})$, a vanadate ion $(VO_4^{3-})$, a borate ion $(BO_3^{3-})$, a chromate ion $(CrO_4^{2-})$, a silicate ion $(SiO_4^{4-})$, a germanate ion $(GeO_4^{4-})$, a borate ion $(BO_4^{5-})$, etc. The amount of the elements substituted is preferably 0.01% by mole or more, more preferably 0.01% by mole or more, and still more preferably 0.1% by mole or more.

The hydroxide ion ($OH^-$) site can be substituted with an element and/or an element group such as $F^-$, $Cl^-$, $Br^-$, $I^-$, $O^{2-}$, $CO_3^{2-}$, $H_2O$, etc. The amount of the element substituted is preferably 0.01% by mole or more, more preferably 0.01% by mole or more, and still more preferably 0.1% by mole or more.

The aforementioned element and/or group of elements may be one type alone or two or more types thereof. It is preferable to be able to control basicity by substituting the element of the phosphate ion ($PO_4^{3-}$) site and/or the hydroxide ion ($OH^-$) site.

It is preferable to confirm as to whether or not the basic apatite contains these various elements or chemical species by emission spectroscopy using an inductively coupled plasma (ICP) as a light source or ICP emission spectroscopy. With respect to an anion, oxygen, etc. are eliminated, and the anion is detected in the form of being decomposed into the elemental unit. However, the anion contained in the crystal structure of the basic apatite can be detected and identified by comprehensively taking into consideration the detected amount, X-ray structural analysis and other various measurement methods. For example, even though a single crystal structure is observed from the result of X-ray structural analysis of the basic apatite, when many kinds of elements forming anions are observed by ICP emission spectrometry, many types of anions are considered to be contained in the cation exchanger. As a method of directly observing an anion, inorganic particles are dissolved with an acid or base, etc. followed by identification thereof by ion chromatography.

A method for obtaining apatite is not particularly restricted and a publicly known method can be used. Examples of the method for producing apatite include a dry method and a wet method. The dry method includes a method for performing heat treatment of calcium carbonate, calcium pyrophosphate, calcium hydrogen phosphate, etc. used as a raw material at an elevated temperature of about 1200° C.; and a method for subjecting bones such as a bovine bone and a chicken bone to heat treatment at elevated temperatures of 900° C. to 1200° C. As the dry process is simple in process, cost reduction is easy. In particular, in order to substitute a part of Ca of apatite with an alkali metal and/or an alkaline-earth metal as described above, or to substitute a part of $PO_4^{3-}$ of apatite with $SO_4^{2-}$, $CO_3^{2-}$, $HPO_4^{2-}$, $SiO_4^{4-}$, etc., it is efficient to synthesize apatite using bones such as the bovine bone and the chicken bone as a main component. On the other hand, the wet method is based on a reaction in an aqueous solution, and apatite can be obtained in the vicinity of normal atmosphere or under a hydrothermal condition by reacting calcium salt with phosphoric acid and/or phosphate under neutral to alkaline conditions. Apatite obtained by the wet method tends to be more excellent in purity and crystallinity than by the dry method. Further, the apatite obtained by the wet method may be subjected to a calcination treatment at 200 to 1300° C. By performing the calcination process, the adsorbed water that causes a battery swelling in a nonaqueous electrolyte battery can be removed.

The inorganic particles for a battery according to the present embodiment is particularly preferably calcium silicate. Examples of calcium silicate include CSH (low crystalline calcium silicate hydrate), Truscottite, Jennite, Gyrolite, Tobermorite, Wollastonite, C2S, and Xonotlite.

With respect to the calcium silicate of the present embodiment, a part of the Ca or Si element may be substituted with another element. The substitution element is not particularly limited, however, for example, a part of the Si element may be substituted with an Al element, and further Na, K element, etc. may be simultaneously introduced for charge compensation. The amount of substitution with another element is preferably 40% by mole or less with respect to the total amount of Si and Al elements before substitution, in order to maintain the crystal structure.

The raw material and the production method of calcium silicate are not restricted so long as it is a material within the scope of the present embodiment. A method for melting and cooling natural products, silica stone and limestone with an electric furnace etc., a method for calcinating them with a rotary furnace in a temperature range without melting, a method for obtaining by hydrothermal synthesis regardless of a Si source and a Ca source, or a method for being subjected to a pressurized hydrothermal synthesis followed by calcination, may be applied for the production of calcium silicate.

The basic inorganic particles according to the present embodiment are preferably nonmetallic, i.e., a semiconductor or an insulator. In particular, the electrical resistivity is preferably $10^3$ Ω·m or more. The semiconductor or insulator having an electrical resistivity of $10^3$ Ω·m or more is preferable since it does not deteriorate charge/discharge characteristics or safety in a battery.

Furthermore, as for a secondary particle size of the basic inorganic particles, it is preferable that the average particle diameter (D50) thereof is from 0.05 μm to 4.0 μm. The lower limit thereof is more preferably 0.1 μm or more, and still more preferably 0.2 μm or more. The upper limit thereof is more preferably 3.5 μm or less, and still more preferably 3.0 μm or less. It is preferable to adjust the average secondary particle size to the above range because the energy density of a nonaqueous electrolyte battery tends to be enhanced. The primary particle size is not particularly limited, however preferably 10 nm to 2.0 μm.

A method of controlling the average secondary particle size of the basic inorganic particles in the range of 0.05 μm to 4.0 μm, is not particularly restricted, and examples thereof may include conventionally and publicly known methods such as an axial flow milling method, annular milling method, roller milling method, ball milling method, jet milling method, a rotary container type compression and shear milling method, a pulverizing method in a porcelain mortar.

The shape of the basic inorganic particles according to the present embodiment may be plate-like, scale-like, acicular, columnar, spherical, polyhedral, massive shape, etc., and preferably plate-like or acicular. An aspect ratio is not particularly limited.

A BET specific surface area of the basic inorganic particles according to the present embodiment is preferably 3 $m^2/g$ or more. When the BET specific surface area is 3 $m^2/g$ or more, life characteristics or safety of a nonaqueous electrolyte battery can be further improved. In addition, it is more preferable that the BET specific surface area is 3 $m^2/g$ or more and 2,000 $m^2/g$ or less. When the BET specific surface area exceeds 2,000 $m^2/g$, the inorganic particles tend to aggregate and the energy density of a nonaqueous electrolyte battery tends to decrease.

The basic inorganic particles described above may be used singly, or two or more thereof may be used in combination.

The basic inorganic particles according to the present embodiment may be present in any member between the positive electrode and the negative electrode, including an outer package, a positive electrode, a negative electrode and a separator in a nonaqueous electrolyte battery, and thus are capable of effectively reducing an adverse effect of deposited metal ions. Therefore, the inorganic particles are preferably contained in the positive electrode, the separator or the negative electrode. In order to realize this configuration, a method for mixing with a positive electrode active material, a method for coating on a surface of the positive electrode, which is exposed to an electrolyte solution, a method for mixing inside of the separator, a method for coating on an arbitrary principal surface of the separator, a method for coating on a surface of the negative electrode, which is exposed to the electrolyte solution, and a method for mixing with a negative electrode active material, can be applied. In particular, in order to effectively remove HF, a battery configuration of the positive electrode/a layer containing the basic inorganic particles/the separator/the negative electrode, or of the positive electrode/the separator/the layer containing the basic inorganic particles/the negative electrode, is preferable (it should be noted that the description "the positive electrode/the separator/a layer containing basic inorganic particles/the negative electrode" indicates that each layer is laminated in this order, and the description "the positive electrode/the separator/the layer containing basic inorganic particles/the negative electrode" indicates that each layer is laminated in order). In order to realize this configuration, a method for coating on a surface of the positive electrode, which is exposed to the electrolytic solution, a method for coating on an arbitrary principal surface of the separator, a method for mixing inside of the separator, and a method for coating on a surface of the negative electrode, which is exposed to the electrolytic solution, are included. Among them, the method for mixing inside of the separator and the method for coating on the separator are more preferable since the practicability of the manufacturing process of a nonaqueous electrolyte battery is excellent. Particularly, the method for coating on the separator is more preferable. More preferably, the layer containing the basic inorganic article is preferably placed on the surface side facing the positive electrode.

Moreover, the basic inorganic particles according to the present embodiment are preferably basic inorganic particles, wherein a HF concentration decreases to less than 90% of an initial HF concentration in 5 minutes at 23° C. after adding the basic inorganic particles into 100 parts by weight of a cyclic and/or a linear carbonate solution having the HF concentration of 10 to 10,000 ppm and containing 0.1 to 6.0 mol/L of $LiPF_6$ such that the amount of the basic inorganic particles is [HF concentration (ppm)]/100 parts by weight. The HF concentration decreases to more preferably less than 85% and furthermore preferably less than 80%.

For example, the basic inorganic particles are preferably basic inorganic particles, wherein a HF concentration decreases to less than 720 ppm in 5 minutes at 23° C., after adding 8 parts by weight of the basic inorganic particles into 100 parts by weight of a nonaqueous electrolyte solution, which is prepared by diluting a cyclic and/or a linear carbonate solution containing 1 mol/L of $LiPF_6$ with distilled water such that it has a HF concentration of 800 ppm. In this example, the HF concentration decreases to more preferably less than 680 ppm, and furthermore preferably less than 640 ppm.

If the inorganic particles for a nonaqueous electrolyte battery comprise non-basic inorganic particles in addition to the basic inorganic particles and it is difficult to evaluate changes in HF concentration for the basic inorganic particles solely, the particles may be evaluated in a mixed state. Since they can be evaluated as the inorganic particles for a nonaqueous electrolyte battery, changes of the HF concentration in the mixed state may as well be evaluated.

[Other Particle]

Moreover, in the layer containing the basic inorganic particles of the present embodiment, non-basic inorganic particles (hereinafter, referred to as "other inorganic particles") are preferably contained. Although the basic inorganic particles strongly adsorb HF, their crystal structure comes not to be retained during the adsorption, some of the basic inorganic particles collapse, and there occurs a case where the configuration of the particles is difficult to be maintained. In particular, when a layer is formed in a thin film of several microns, the influence thereof is pronounced. Taking this into consideration, in a layer containing the basic inorganic particles of the present embodiment, a material having a low reactivity with HF such as other inorganic particles is further preferably contained. According to this constitution, it is possible to prevent a problem in the battery due to particle fall-off of the basic inorganic particles, etc., and to exhibit a higher HF adsorption capacity.

When the non-basic inorganic particles of the present embodiment is further contained in a layer containing the basic inorganic particles, it is most preferable that the hydrophilic parameter A is evaluated solely for the basic inorganic particles. However, when it is difficult to separate the basic inorganic particles from the non-basic inorganic particles, the measurement may be performed for a mixture of the basic inorganic particles and non-basic inorganic particles. Even in the mixed state, the mixture is only required to satisfy the value of the hydrophilic parameter A (=BET 1/BET 2) of 0.45 or more and 2.0 or less. When the A is the lower limit or greater, the basic inorganic particles exhibit a good interaction with HF and can effectively adsorb HF on the surface of the particle. Moreover, when the aforementioned A is the upper limit or less, it is possible to suppress battery swelling. Even though the non-basic inorganic particles are added, the basic inorganic particles can favorably be interacted with HF when controlled in the aforementioned range, and the battery swelling can be suppressed. Thereby the basic inorganic particles and non-basic inorganic particles may be evaluated in the form of mixture.

The other inorganic particles according to the present embodiment are preferably nonmetallic, i.e., a semiconductor or an insulator. In particular, the electrical resistivity thereof is preferably $10^3$ Ω·m or more. The semiconductor or insulator having an electrical resistivity of $10^3$ Ω·m or more is preferable because it does not impair charge/discharge characteristics or safety in a battery.

Moreover, with regard to a secondary particle size of the other inorganic particles, the average particle diameter (D50) is preferably 0.05 μm to 4.0 μm. The lower limit thereof is more preferably 0.1 μm or more, and still more preferably 0.2 μm or more. The upper limit thereof is more preferably 3.5 μm or less, and still more preferably 3.0 μm or less. Adjusting the average secondary particle size within the above range, the energy density of a nonaqueous electrolyte battery tends to be increased. The primary particle diameter is not particularly restricted, however, is preferably 10 nm to 2.0 μm.

A method of controlling the average secondary particle size of the other inorganic particles in the range of 0.05 μm to 4.0 μm, is not particularly restricted, and examples thereof may include conventionally and publicly known methods such as an axial flow milling method, annular milling method, roller milling method, ball milling method, jet milling method, a rotary container type compression, shear milling method, and pulverizing method in a porcelain mortar.

The shape of the other inorganic particles according to this embodiment may be plate-like, scale-like, acicular, columnar, spherical, polyhedral, massive shape, etc., and preferably plate-like or acicular. An aspect ratio is not particularly limited.

The BET specific surface area of the other inorganic particles according to the present embodiment is preferably 3 m$^2$/g or more. When the BET specific surface area is 3 m$^2$/g or more, life characteristics or safety of a nonaqueous electrolyte battery may be further improved. Further, it is more preferable that the BET specific surface area is 3 m$^2$/g or greater and 2,000 m$^2$/g or less. When the BET specific surface area exceeds 2000 m$^2$/g, the other inorganic particle tend to aggregate, and the energy density of the nonaqueous electrolyte battery tends to decrease.

The other inorganic particles described above may be used singly, or two or more thereof may be used in combination.

The other inorganic particles may be preferably at least one inorganic particles selected from the group consisting of anion adsorbents, such as a layered double hydroxide (Mg—Al type, Mg—Fe type, Ni—Fe type, Li—Al type), a layered double hydroxide-alumina silica gel complex, boehmite, alumina, zinc oxide, lead oxide, iron oxide, iron oxyhydroxide, hematite, bismuth oxide, tin oxide, titanium oxide, zirconium oxide, etc., cation adsorbents, such as zirconium phosphate, titanium phosphate, apatite, non-basic titanate, niobate, niobate•titanate, etc., zeolite, carbonates and sulfates, such as calcium sulfate, magnesium sulfate, aluminum sulfate, gypsum, barium sulfate, etc., oxide-based ceramics, such as alumina trihydrate (ATH), fumed silica, precipitated silica, zirconia, yttria, etc., nitride-based ceramics, such as silicon nitride, nitrogen titanium, boron nitride, etc., layered silicates, such as silicon carbide, talc, dickite, nacrite, halloysite, pyrophyllite, montmorillonite, sericite, amesite, bentonite, etc., asbestos, diatomite, glass fiber, synthesized layered silicates, such as mica or fluoromica, and zinc borate.

Particularly, the other inorganic particles are preferably an anion adsorbent and/or a cation adsorbent. When the other inorganic particles are an anion adsorbent or a cation adsorbent, the HF adsorption capacity of the basic inorganic particles is further enhanced.

There is no particular restriction on the non-basic anion adsorbent, and examples thereof include a layered double hydroxide (Mg—Al type, Mg—Fe type, Ni—Fe type, Li—Al type), a layered double hydroxide-alumina silica gel composite, boehmite, alumina, zinc oxide, lead oxide, iron oxide, iron oxyhydroxide, hematite, bismuth oxide, tin oxide, titanium oxide, and zirconium oxide. From the viewpoint of comparatively low content of moisture and prevention of battery swelling, as the anion adsorbent, boehmite, alumina, zinc oxide, lead oxide, iron oxide, iron oxyhydroxide, hematite, lanthanum oxide, bismuth oxide, tin oxide, titanium oxide, cerium oxide, zirconium oxide, etc., are preferable. The anion adsorbents may be used singly, or two or more thereof may be used in combination.

Examples of the non-basic cation adsorbent include zirconium phosphate, titanium phosphate, apatite, non-basic titanate, niobate, and niobate•titanate.

[Separator]

A separator is only required to have a high ion permeability and a function to isolate electrically a positive electrode and a negative electrode. A conventionally and publicly known separator used for a nonaqueous electrolyte battery may be used without any particular restriction.

Specifically, a microporous membrane or a nonwoven fabric composed of a material, which is stable in a nonaqueous electrolyte in a battery and stable electrically such as a polyolefin (e.g. polyethylene (PE), polypropylene (PP)), polyester, polyimide, polyamide, polyurethane, etc. may be used as a separator. It is preferable that the separator has a property of closing the pores (i.e., a shutdown function) at 80° C. or higher (more preferably 100° C. or higher), and 180° C. or lower (more preferably 150° C. or lower). Therefore, it is more preferable to use a microporous membrane or a nonwoven fabric containing a polyolefin having a melting temperature, namely a melting temperature measured with a differential scanning calorimeter (DSC) according to the stipulations of JIS K 7121, of 80° C. or higher (more preferably 100° C. or higher), and 180° C. or lower (more preferably 150° C. or lower) for a separator. In this case, the microporous membrane or the nonwoven fabric to be used as a separator may be constituted solely with PE, or solely of PP, or may include two or more kinds of materials. Further, the separator may be a laminate of a microporous membrane made of PE and a microporous membrane made of PP (for example, PP/PE/PP three-layer laminate), etc.

The viscosity-average molecular weight (Mv) of the polymer resin constituting the aforementioned separator is preferably 10,000 to 1,000,000 in that the desired shutdown performance of the separator is exhibited.

As the aforementioned microporous membrane, for example, an ion-permeable porous membrane (microporous membrane used widely as a separator for a nonaqueous electrolyte battery) having many pores formed by a conventionally known solvent extraction method, a dry or wet stretching method, etc., may be used.

A nonaqueous electrolyte battery separator containing the inorganic particles for a nonaqueous electrolyte battery described above is also an aspect of the present invention.

In a case where the separator contains the inorganic particles for a nonaqueous electrolyte battery according to the present embodiment, it is possible not only to form a single layer structure separator by adding the inorganic particles for a nonaqueous electrolyte battery into the above microporous membrane or nonwoven fabric, but also to form a multilayer structure separator using the microporous membrane or the nonwoven fabric as a base material, and placing a porous layer containing the inorganic particles for a battery on either or both sides of the same.

In addition, the inorganic particles for a nonaqueous electrolyte battery can be contained in a nonaqueous electrolyte or an outer package.

In a case of the aforementioned multilayer separator, the microporous membrane or the nonwoven fabric as the base material constitutes a layer having a principal function of a separator that transmits ions while preventing a short circuit between a positive electrode and a negative electrode, and the porous layer containing the inorganic particles for a nonaqueous electrolyte battery play a role in adsorbing metal ions dissolved from a positive electrode active material into a nonaqueous electrolyte. From this viewpoint, a separator in which at least one side of the base material is uniformly provided with a film of the inorganic particles for a nonaqueous electrolyte battery, is preferable.

Further, in the multilayer structure separator described above, in order to secure the shutdown function, the base material is preferably a microporous membrane or a nonwoven fabric mainly composed of a polyolefin having the above melting temperature, and is more preferably a microporous membrane mainly composed of a polyolefin having the above melting temperature. In other words, it is particularly preferable that the multilayer structure separator has a porous layer containing the inorganic particles for a nonaqueous electrolyte battery, and a porous layer mainly composed of a polyolefin having the above melting temperature.

In the aforementioned multilayer structure separator, the microporous membrane or the nonwoven fabric serving as the base material, and the porous layer containing the inorganic particles for a nonaqueous electrolyte battery may be one body, or each may be an independent membrane, such that they may be combined together in the battery to constitute a separator.

In a multilayer structure separator having the porous layer containing the inorganic particles for a nonaqueous electrolyte battery and the porous layer mainly composed of a polyolefin having the above melting temperature, the content of polyolefin in the total volume of the constituent components (the total volume excluding the pore portion) of the porous layer composed mainly of a polyolefin is preferably 30% by volume or more, more preferably 50% by volume or more, and especially preferably 100% by volume or less.

In a multilayer structure separator having the porous layer containing the inorganic particles for a nonaqueous electrolyte battery and the porous layer mainly composed of a polyolefin having the above melting temperature, the porous layer mainly composed of a polyolefin (especially a microporous membrane) is prone to cause thermal shrinkage when the temperature inside a battery is high. However, in the separator having the multilayer structure described above, the porous layer containing the inorganic particles for a nonaqueous electrolyte battery that is resistant to thermal shrinkage acts as a heat resistant layer, and the thermal shrinkage of the whole separator may be suppressed, so that a nonaqueous electrolyte battery superior in safety under high temperature may be accomplished.

In using the above-described multilayer structure separator, the layer containing the inorganic particles for a nonaqueous electrolyte battery preferably contains a binder in order to bind inorganic particles together, or bind the layer containing the inorganic particles for a nonaqueous electrolyte battery with a base material (the nonwoven fabric, or the microporous membrane described above).

There is no particular restriction on the binder, but, more preferably, for example, at least one selected from the group consisting of particles of a non-conductive polymer or a polymer having a core-shell structure.

The particles of a non-conductive polymer or a polymer having a core-shell structure include resins which are roughly classified into the following (b1) to (b4):
(b1) Nitrile resin
(b2) Acrylic resin
(b3) Aliphatic conjugated diene resin
(b4) Resin different from (b1) to (b3)
(b1) Nitrile Resin The nitrile resin is a resin containing a polymerization unit having a nitrile group as a main component. In the present specification, containing a polymerization unit as a main component means that it is 50% by mole or more with respect to the total mole of all the monomers charged at the time of polymerization. The nitrile resin may contain, optionally, in addition to a polymerization unit having a nitrile group, at least one selected from the group consisting of an ethylenically unsaturated compound, a linear alkylene polymerization unit having 4 or more carbon atoms, a polymerization unit having a hydrophilic group, a polymerization unit having a reactive group, an aromatic vinyl polymer unit, and a polymer unit having a thermally crosslinkable group. Examples of the thermally crosslinkable group include an epoxy group, a N-methylolamide group, an oxazoline group, an allyl group, etc. In a case of having the thermally crosslinkable group, the amount of the monomer unit having the thermally crosslinkable group in the nitrile resin is preferably 0.01 parts by weight or more and 4 parts by weight or less with respect to the total amount, 100 parts by weight of (meth)acrylonitrile monomer units and (meth)acrylic acid ester monomer units.

The iodine value of the nitrile resin is preferably 3 to 60 mg/100 mg, more preferably 3 to 30 mg/100 mg, and still more preferably 3 to 10 mg/100 mg.

The nitrile resin can be obtained by polymerization of a monomer having a nitrile group, or by copolymerization of a monomer having a nitrile group and another monomer. The monomer having a nitrile group is, for example, (meth)acrylonitrile, etc. The (meth)acrylonitrile means acrylonitrile or methacrylonitrile.

Such other monomer includes ethylenically unsaturated compounds, for example, (meth)acrylic acid, such as 2-methacrylic acid, 2-pentenoic acid, 2,3-dimethylacrylic acid, 3,3-dimethylacrylic acid, itaconic acid, these alkali metal salts, etc. (Meth)acrylic acid ester means acrylic acid ester or methacrylic acid ester, and in a (meth)acrylic acid ester monomer, a part or all of hydrogens of the alkyl group can be a haloalkyl group substituted for a halogen group, such as fluorine, etc. The number of carbon atoms bonded to a non-carbonyl oxygen atom of the (meth)acrylic acid alkyl ester is preferably 1 to 14, and more preferably 1 to 5.

Examples of (meth)acrylic acid alkyl ester having 1 to 5 carbon atoms in the alkyl group bonded to a non-carbonyl oxygen atom includes acrylic acid alkyl esters, such as methyl acrylate, ethyl acrylate, n-propyl acrylate, isopropyl acrylate, n-butyl acrylate, t-butyl acrylate, hexyl (meth)acrylate, 2-ethylhexyl (meth)acrylate, etc.; and carboxylic acid esters having two or more carbon-carbon double bonds, such as ethylene glycol dimethacrylate, diethylene glycol dimethacrylate, trimethylolpropane triacrylate, etc.

Other (meth)acrylic acid alkyl ester includes acrylic acid alkyl esters having 6 to 18 carbon atoms of an alkyl group bonded to a non-carbonyl oxygen atom, such as n-hexyl acrylate, 2-ethylhexyl acrylate, nonyl acrylate, lauryl acrylate, stearyl acrylate, cyclohexyl acrylate, isobornyl acrylate, etc.; methacrylic acid alkyl esters having 6 to 18 carbon atoms of an alkyl group bonded to a non-carbonyl oxygen atom, such as n-hexyl methacrylate, 2-ethylhexyl methacrylate, octyl methacrylate, isodecyl methacrylate, lauryl methacrylate, tridecyl methacrylate, stearyl methacrylate, cyclohexyl methacrylate, etc.; 2-(perfluoroalkyl)ethyl acrylates having 6 to 18 carbon atoms of an alkyl group bonded to a non-carbonyl oxygen atom, such as 2-(perfluorohexyl)ethyl acrylate, 2-(perfluorooctyl) ethyl acrylate, 2-(perfluorononyl)ethyl acrylate, 2 (perfluorodecyl)ethyl acrylate, 2-(perfluorododecyl)ethyl acrylate, 2-(perfluorotetradecyl) ethyl acrylate, 2-(perfluorohexadecyl)ethyl acrylate, etc.; 2-(perfluoroalkyl)ethyl methacrylates having 6 to 18 carbon atoms of an alkyl group bonded to a non-carbonyl oxygen atom, such as 2-(perfluorohexyl)ethyl methacrylate, 2-(perfluorooctyl)ethyl methacrylate, 2-(perfluorononyl)ethyl methacrylate, 2-(perfluorodecyl)ethyl methacrylate, 2-(perfluorododecyl)ethyl methacrylate, 2-(perfluorotetradecyl) ethyl methacrylate, 2-(perfluorohexadecyl)ethyl methacrylate, etc.

The polymerization unit of linear alkylene having 4 or more carbon atoms is, for example, butadiene, isoprene, pentadiene, etc.

A hydrophilic group means a functional group which liberates a proton in an aqueous solvent and a salt in which the proton is substituted for a cation, and specifically includes a carboxylic acid group, a sulfonic acid group, a hydroxyl group, a phosphoric acid group, salts thereof etc. The content ratio of the aforementioned hydrophilic group is preferably in the range of 0.05 to 10% by weight.

The introduction of the hydrophilic group into the nitrile resin is carried out by polymerizing a monomer containing a carboxylic acid group, a sulfonic acid group, a hydroxyl group, a phosphoric acid group, metal salts or ammonium salts of these groups, etc.

Examples of a monomer having a carboxylic acid group include monocarboxylic acid and derivative thereof, dicarboxylic acid, and these derivatives. Examples of monocarboxylic acid include acrylic acid, methacrylic acid, 3-butenoic acid, crotonic acid, etc. Examples of a monocarboxylic acid derivative include 2-ethyl acrylic acid, isocrotonic acid, α-acetoxy acrylic acid, β-trans-aryloxy acrylic acid, α-chloro-β-E-methoxy acrylic acid, β-diamino acrylic acid, trans-butenedioic acid, cis-butenedioic acid, etc. Examples of dicarboxylic acid include maleic acid, fumaric acid, itaconic acid, etc. Examples of the dicarboxylic acid derivative include methylmaleic acid, dimethylmaleic acid, phenylmaleic acid, chloromaleic acid, dichloromaleic acid, fluoromaleic acid, etc. and further, maleic esters, such as methylallyl maleate, diphenyl maleate, nonyl maleate, decyl maleate, dodecyl maleate, octadecyl maleate, fluoroalkyl maleate, etc. Moreover, acid anhydride which produces a carboxyl group by hydrolysis can also be used. As acid anhydride of dicarboxylic acid, maleic anhydride, acrylic anhydride, methyl maleic anhydride, dimethyl maleic anhydride, etc. are included.

As a monomer having a sulfonic acid group, vinyl sulfonic acid, methyl vinyl sulfonic acid, (meth)allyl sulfonic acid, styrene sulfonic acid, 2-sulfoethyl (meth)acrylate, 2-acrylamide-2-methylpropane sulfonic acid and 3-allyloxy-2-hydroxypropane sulfonic acid, are included.

A monomer having a hydroxyl group includes ethylenically unsaturated alcohols, such as (meth)allyl alcohol, 3-buten-1-ol, 5-hexen-1-ol, etc; alkanol esters of ethylenically unsaturated carboxylic acid, such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, di-2-hydroxypropyl itaconate, etc.; esters of polyalkylene glycol represented by the general formula: $CH_2=CR_1-COO-((CH_2)_nO)_m-H$ (m is an integer of 2 to 9, n is an integer of 2 to 4, R1 is hydrogen or a methyl group), with (meth)acrylic acid; mono (meth)acrylic acid esters of dihydroxy ester of dicarboxylic acid, such as 2-hydroxyethyl-2'-(meth)acryloyloxy phthalate, 2-hydroxyethyl-2'-(meth)acryloyloxy succinate, etc.; vinyl ethers, such as 2-hydroxyethyl vinyl ether, 2-hydroxypropyl vinyl ether, etc.; mono (meth)allyl ethers of alkylene glycol, such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, (meth)allyl-6-hydroxyhexyl ether, etc.; polyoxyalkylene glycol mono(meth)allyl ethers and glycerin mono(meth)allyl ethers, such as diethylene glycol mono(meth)allyl ether, dipropylene glycol mono(meth)allyl ether, etc.; mono(meth)allyl ethers of a halogen and hydroxy-substituted compound of (poly)alkylene glycol, such as (meth)allyl-2-chloro-3-hydroxypropyl ether, (meth)allyl-2-hydroxy-3-chloropropyl ether, etc.; mono (meth)allyl ethers of polyphenol and halogen-substituted compounds thereof such as eugenol, isoeugenol, etc.; (meth)allyl thioethers of alkylene glycol, such as (meth)allyl-2-hydroxyethyl thioether, (meth)allyl-2-hydroxypropyl thioether, etc.

Examples of a monomer having a phosphoric acid group include 2-(meth)acryloxyethyl phosphate, 2-(meth)acryloxyethyl methyl phosphate, 2-(meth)acryloxyethyl ethyl phosphate, etc.

The polymerization unit having a reactive group may be introduced for the reactivity with a surface functional group of the inorganic particles, and for the improvement of the dispersibility of the inorganic particles used when producing a slurry. As for the polymerization unit having a reactive group, when the surface functional group of the inorganic particles is an amino group, a reactive group of the nitrile resin is preferably an epoxy group, a carbonyl group, and a carboxyl group, and more preferably the epoxy group.

Moreover, when a surface functional group of the aforementioned inorganic particle is an epoxy group, a reactive group of the nitrile resin is preferably a sulfonic acid group, an amino group, a phosphoric acid group, a hydroxyl group, a mercapto group, and an isocyanate group, and the sulfonic acid group and the amino group are more preferable.

Furthermore, when a surface functional group of the aforementioned inorganic particle is a mercapto group, a reactive group of the nitrile resin is preferably an epoxy group and a mercapto group.

In addition, when the surface functional group of the inorganic particles is an isocyanate group, a reactive group of the nitrile resin is preferably an epoxy group and a hydroxyl group.

Additionally, when the surface functional group of the inorganic particles is a hydroxyl group or a carboxyl group, a carbodiimide group, an epoxy group, an oxazoline group, a hydrazide group, and an isocyanato group, are preferable.

Furthermore, the nitrile resin may contain an arbitrary another repeating unit, in addition to the repeating units described above (i.e., (meth)acrylonitrile monomer units, (meth)acrylic acid ester monomer units and monomer units having a thermally crosslinkable group). Examples of monomers corresponding to the aforementioned arbitrary repeating units include styrene-based monomers, such as styrene, chlorostyrene, vinyltoluene, t-butylstyrene, vinylbenzoic acid, methyl vinylbenzoate, vinylnaphthalene, chloromethylstyrene, α-methylstyrene, divinylbenzene, etc.; olefins, such as ethylene, propylene, etc.; halogen atom-containing monomers, such as vinyl chloride, vinylidene chloride, etc.; vinyl esters, such as vinyl acetate, vinyl propionate, vinyl butyrate, etc.; vinyl ethers, such as methyl vinyl ether, ethyl vinyl ether, butyl vinyl ether, etc.; vinyl ketones, such as methyl vinyl ketone, ethyl vinyl ketone, butyl vinyl ketone, hexyl vinyl ketone, isopropenyl vinyl ketone, etc.; heterocyclic ring-containing vinyl compounds, such as N-vinyl pyrrolidone, vinyl pyridine, vinylimidazole, etc.; amide-based monomers, such as acrylamide, etc.; sulfonic acid esters, such as acrylamide-2-methylpropane sulfonic acid, etc.; an imino compound, maleimide, an unsaturated polyalkylene glycol ether-based monomer, an ethylene functional silicon-containing monomer, chelate compounds, isothiazolines, siloxanes, sulfosuccinic acid ester, salts thereof, etc. The nitrile resin may contain singly one kind of the aforementioned arbitrary repeating units or may contain two or more kinds combined in an arbitrary ratio. However, from the viewpoint of remarkably exhibiting the advantage of including the (meth)acrylonitrile monomer unit and the (meth)acrylate monomer unit as described above, it is preferable to contain a less amount of the aforementioned arbitrary repeating units, and particularly preferable not to contain any of the above repeating units.

The weight-average molecular weight of the nitrile resin is preferably 10,000 or more, more preferably 20,000 or more, preferably 2,000,000 or less, and more preferably 50,000 or less. When the weight-average molecular weight of the nitrile resin falls within the above range, the strength of the porous film and the dispersibility of the non-conductive polymer of the present invention can be easily improved.

The volume-average particle diameter D50 of the nitrile resin is preferably 0.01 µm or more, preferably 0.5 µm or less, and furthermore preferably 0.2 µm or less. When the volume-average particle diameter D50 of the nitrile resin is equivalent to or more than the lower limit of the above range, the porosity of the porous film of the present invention is maintained high to suppress the resistance of the porous film, and thereby the battery physical properties are favorably maintained. In addition, by setting it below the upper limit of the above range, the binding property can be enhanced due to increase in bonding points between a non-conductive particle and a nonaqueous particulate polymer.

The glass transition temperature (Tg) of the nitrile resin is preferably 20° C. or lower, more preferably 15° C. or lower, and particularly preferably 5° C. or lower. When the glass transition temperature (Tg) falls within the above range, the flexibility of the porous film of the present invention is enhanced and the bending resistance of an electrode and a separator is improved, so that the defect rate due to rupture of the porous film of the present invention is reduced. In addition, cracks or chips, etc. of the porous film, the separator and the electrode of the present invention when wound on a roll or wound, can be avoided. It is noted here that the glass transition temperature of the nonaqueous particulate polymer can be adjusted by combining various monomers. The lower limit of the glass transition temperature of the nitrile resin is not particularly restricted but can be −50° C. or higher.

In a manufacturing process of the nitrile resin, a dispersant used in the polymerization method may be one used in ordinary synthesis, and specific examples include benzenesulfonates, such as sodium dodecylbenzenesulfonate, sodium dodecyl phenyl ether sulfonate, etc.; alkyl sulfates, such as sodium lauryl sulfate, sodium tetradodecyl sulfate, etc.; sulfosuccinates, such as sodium dioctyl sulfosuccinate, sodium dihexyl sulfosuccinate, etc.; fatty acid salts such as sodium laurate, etc.; ethoxy sulfates, such as polyoxyethylenelauryl ether sodium sulfate, polyoxyethylene nonylphenyl ether sodium sulfate, etc.; an alkane sulfonate; an alkyl ether sodium phosphate; nonionic emulsifiers, such as polyoxyethylene nonylphenyl ether, polyoxyethylene sorbitan lauryl acid ester, a polyoxyethylene-polyoxypropylene block copolymer, etc.; aqueous polymers, such as gelatin, a maleic anhydride-styrene copolymer, polyvinyl pyrrolidone, sodium polyacrylate, polyvinyl alcohol having a polymerization degree of 700 or more and a saponification degree of 75% or more, etc., and these may be used singly or in combination of two or more. Among these, benzene sulfonates, such as sodium dodecylbenzenesulfonate, sodium dodecyl phenyl ether sulfonate, etc.; and alkyl sulfates, such as sodium lauryl sulfate, sodium tetradodecyl sulfate, etc. are preferable, and benzene sulfonates, such as sodium dodecylbenzenesulfonate and sodium dodecyl phenyl ether sulfonate are more preferable from the viewpoint of resistance to oxidation. The amount of the dispersant added can be arbitrarily set and is usually about 0.01 to 10 parts by weight with respect to 100 parts by weight of the total amount of monomers.

A pH of the nitrile resin dispersed in a dispersion medium is preferably 5 to 13, more preferably 5 to 12, and most preferably 10 to 12. When the pH of the nitrile resin is in the above range, the storage stability of the nitrile resin is improved, and the mechanical stability is further enhanced.

A pH modifier for adjusting pH of the nitrile resin includes alkali metal hydroxides, such as lithium hydroxide, sodium hydroxide, potassium hydroxide, etc. alkaline-earth metal oxides, such as magnesium hydroxide, calcium hydroxide, barium hydroxide, etc., of a group 2 element oxide, hydroxides, such as hydroxides of a metal belonging to elements of groups IIIa in the long periodical table, such as aluminum hydroxide, etc.; alkali metal carbonates, such as sodium carbonate, potassium carbonate, etc., carbonates of group 2 element carbonates, such as magnesium carbonate, etc.; and examples of an organic amine include alkylamines, such as ethylamine, diethylamine, propylamine, etc.; alcohol amines, such as monomethanol amine, monoethanol amine, monopropanol amine, etc.; ammonias, such as ammonia water. Among these, alkali metal hydroxide is preferable from the viewpoint of binding property and handleability, and sodium hydroxide, potassium hydroxide and lithium hydroxide are particularly preferable.

The nitrile resin may contain a crosslinking agent. Examples of the crosslinking agent include a carbodiimide compound, a polyfunctional epoxy compound, an oxazoline compound, a polyfunctional hydrazide compound, an isocyanate compound, a melamine compound, a urea compound, and a mixture thereof.

Specific examples of the nitrile resin include polyacrylonitrile, an acrylonitrile-butadiene copolymer, an acrylonitrile-styrene copolymer, an acrylonitrile-butadiene-styrene copolymer, an acrylonitrile-styrene-acrylate copolymer, or these hydrogenated products.

(b2) Acrylic Resin

An acrylic resin is a resin obtained by using an acrylic compound as a main monomer. Using it as a main monomer means that it is 50% by mole or more with respect to the total mole of all the monomers charged at the time of polymerization. The acrylic compound is a monomer having a (meth)acryloyl group which is an acryloyl group or a methacryloyl group.

The acrylic resin may contain optionally, in addition to a polymerization unit having an acryloyl group, at least one selected from the group consisting of an ethylenically unsaturated compound containing (meth)acrylonitrile, a linear alkylene polymerization unit having 4 or more carbon atoms, a polymerization unit having a hydrophilic group, a polymerization unit having a reactive group, an aromatic vinyl polymer unit, and a polymerization unit having a thermally crosslinkable group. Examples of the thermally crosslinkable group include an epoxy group, a N-methylolamide group, an oxazoline group, an allyl group, etc. When having the thermally crosslinkable group, the amount of the monomer unit having a thermally crosslinkable group in the acrylic resin is 0.01 parts by weight or more and 4 parts by weight or less with respect to the 100 parts by weight of the total amount of the (meth)acrylonitrile monomer unit and the (meth)acrylic acid ester monomer unit.

The acrylic resin can be obtained by polymerizing an acryl compound, or by copolymerizing the acryl compound with another monomer.

As the acrylic compound, the following monomers may be used:

As an example of (meth) acrylic acid, for example, acrylic acid, 2-methacrylic acid, 2-pentenoic acid, 2, 3-dimethyl acrylic acid, 3, 3-dimethyl acrylic acid, itaconic acid, these alkali metal salts, etc., are included.

Examples of (meth)acrylic acid ester include (meth) acrylic acid alkyl ester, such as methyl (meth)acrylate, ethyl (meth)acrylate, n-propyl acrylate, isopropyl acrylate, n-butyl (meth)acrylate, t-butyl acrylate, hexyl (meth)acrylate, 2-ethylhexyl (meth)acrylate, etc.; diacrylate compounds having two or more carbon-carbon double bonds, such as ethylene glycol dimethacrylate, diethylene glycol dimethacrylate, trimethylolpropane triacrylate, etc.; a triacrylate compound, a tetraacrylate compound, a dimethacrylate compound, a trimethacrylate compound, etc. In addition, fluorine-containing acrylic acid ester, amide group-containing (meth)acrylic acid or amide group-containing (meth)acrylate; a (meth)acrylic functional silicon-containing monomer, etc., are also included.

Other monomer includes, in addition to an ethylenically unsaturated compound, such as (meth)acrylonitrile, as (meth)acrylic acid alkyl ester, alkyl acrylates, such as methyl acrylate, ethyl acrylate, n-propyl acrylate, isopropyl acrylate, n-butyl acrylate, t-butyl acrylate, hexyl (meth)acrylate, 2-ethylhexyl (meth)acrylate, etc.; and carboxylic acid esters having two or more carbon-carbon double bonds, such as ethylene glycol dimethacrylate, diethylene glycol dimethacrylate, trimethylolpropane triacrylate, etc.

Other (meth)acrylic acid alkyl ester includes alkyl acrylates having 6 to 18 carbon atoms of an alkyl group bonded to a non-carbonyl oxygen atom, such as n-hexyl acrylate, 2-ethylhexyl acrylate, nonyl acrylate, lauryl acrylate, stearyl acrylate, cyclohexyl acrylate, isobornyl acrylate, etc.; alkyl methacrylates having 6 to 18 carbon atoms of an alkyl group bonded to a non-carbonyl oxygen atom, such as n-hexyl methacrylate, 2-ethylhexyl methacrylate, octyl methacrylate, isodecyl methacrylate, lauryl methacrylate, tridecyl methacrylate, stearyl methacrylate, cyclohexyl methacrylate, etc.; 2-(perfluoroalkyl)ethyl acrylates having 6 to 18 carbon atoms of an alkyl group bonded to a non-carbonyl oxygen atom, such as 2-(perfluorohexyl)ethyl acrylate, 2-(perfluorooctyl)ethyl acrylate, 2-(perfluorononyl) acrylate, 2-(perfluorodecyl)ethyl acrylate, 2-(perfluorododecyl) ethyl acrylate, 2-(perfluorotetradecyl)ethyl acrylate, 2-(perfluorohexadecyl)ethyl acrylate, etc.; 2-(perfluoroalkyl)ethyl methacrylates having 6 to 18 carbon atoms of an alkyl group bonded to a non-carbonyl oxygen atom, such as 2-(perfluorohexyl)ethyl methacrylate, 2-(perfluorooctyl)ethyl methacrylate, 2-(perfluorononyl)ethyl methacrylate, 2-(perfluorodecyl)ethyl methacrylate, 2-(perfluorododecyl)ethyl methacrylate, 2-(perfluorotetradecyl)ethyl methacrylate, 2-(perfluorohexadecyl)ethyl methacrylate, etc.

Furthermore, the acrylic resin may contain another arbitrary repeating unit, other than the aforementioned repeating monomer units (i.e., (meth)acrylic monomer units, (meth) acrylonitrile monomer units, (meth)acrylic acid ester monomer units, and monomer units having a thermally crosslinkable group). Examples of the monomer unit corresponding to the aforementioned arbitrary repeating monomer unit include a linear alkylene polymerization unit having 4 or more of carbon atoms, a monomer having a carboxylic acid group, a monomer having a sulfonic acid group, a monomer having a hydroxyl group, a monomer having a phosphoric acid group, a reactive polymerization unit, a styrene-based monomer unit, such as styrene, chlorostyrene, vinyl toluene, t-butylstyrene, vinyl benzoic acid, methyl vinyl benzoate, vinyl naphthalene, chloromethyl styrene, α-methyl styrene, divinyl benzene, etc.; olefins, such as ethylene, propylene, etc.; halogen atom-containing monomers, such as vinyl chloride, vinylidene chloride, etc.; vinyl esters, such as vinyl acetate, vinyl propionate, vinyl butyrate, etc.; vinyl ethers, such as methyl vinyl ether, ethyl vinyl ether, butyl vinyl ether, etc.; vinyl ketones, such as methyl vinyl ketone, ethyl vinyl ketone, butyl vinyl ketone, hexyl vinyl ketone, isopropenyl vinyl ketone, etc.; heterocyclic ring-containing vinyl compounds, such as N-vinyl pyrrolidone, vinyl pyridine, vinyl imidazole, etc.; amide-based monomers, such as acrylamide, etc., sulfonic acid esters, such as acrylamido-2-methylpropane sulfonic acid, etc.; an imino compound, maleimide, an unsaturated polyalkylene glycol ether-based monomer, an ethylene functional silicon-containing monomer, a chelate compound, isothiazolines, siloxanes, sulfosuccinic acid ester and salts thereof, etc. The acrylic resin may contain singly one kind of the aforementioned arbitrary repeating units or may contain two or more kinds combined in an arbitrary ratio. However, from the viewpoint of remarkably exhibiting the advantage of including the (meth) acrylonitrile monomer unit and the (meth)acrylate monomer unit as described above, it is preferable to contain a less amount of the above arbitrary repeating units, and particularly preferable not to contain any of the above repeating units.

The weight-average molecular weight of the acrylic resin is preferably 10,000 or more, more preferably 20,000 or more, preferably 2,000,000 or less, and more preferably 500,000 or less. When the weight-average molecular weight of the acrylic resin falls within the above range, the strength of the porous film of the present invention and dispersibility of a non-conductive polymer can be easily improved.

The volume-average particle diameter D50 of the acrylic resin is preferably 0.01 µm or more, and preferably 0.5 µm or less, and furthermore preferably 0.2 µm or less. When the volume-average particle diameter D50 of the acrylic resin is equivalent to or more than the lower limit of the above range, the porosity of the porous film of the present invention is maintained high to suppress the resistance of the porous film, and thereby the battery physical properties are favorably maintained. In addition, by setting it below the upper limit of the above range, the binding property can be enhanced due to increase in bonding points between a non-conductive particle and a nonaqueous particulate polymer.

The glass transition temperature (Tg) of the acrylic resin is preferably 20° C. or lower, more preferably 15° C. or lower, and particularly preferably 5° C. or lower. When the glass transition temperature (Tg) falls within the above range, the flexibility of the porous film of the present invention is enhanced, the bending resistance of an electrode and a separator is improved, so that the defect rate due to rupture of the porous film of the present invention is reduced. In addition, cracks or chips of the porous film, the separator and the electrode of the present invention when wound on a roll or wound, can be avoided. It is noted here that the glass transition temperature of the nonaqueous particulate polymer can be adjusted by combining various monomers. The lower limit of the glass transition temperature of the acrylic resin is not particularly restricted but can be −50° C. or higher.

In the production process of the acrylic resin, the dispersant used in the polymerization method may be one used in ordinary synthesis.

The pH of the acrylic resin dispersed in the dispersion medium is preferably 5 to 13, more preferably 5 to 12, and most preferably 10 to 12. When the pH of the acrylic resin is in the above range, the storage stability of the acrylic resin is improved, and the mechanical stability is further improved.

The pH of the acrylic resin may be adjusted with a pH adjuster.

The acrylic resin may contain a crosslinking agent.

Specifically, the acrylic resin is an acrylic soft polymer, an acrylic hard polymer, an acrylic-styrene copolymer, a sulfonated acrylic polymer, or a seed polymer, a hydrogenated product or a graft product thereof.

The acrylic resin may be in the form of a non-conductive organic particle. The acrylic resin may be an aqueous resin when formed from an acrylic compound and a silicon-containing monomer. The acrylic resin may contain carboxymethylcellulose as a thickener.

(b3) Aliphatic Conjugated Diene-Based Resin

The aliphatic conjugated diene-based resin is a resin obtained by using an aliphatic monomer having a conjugated diene as a main component. In the present description, when the resin is used as a main component, it is 50% by mole or more with respect to the total moles of all the monomers charged at the time of polymerization.

The aliphatic monomer having a conjugated diene is a substituted or unsubstituted linear diene and may be linear or branched. Specifically, the aliphatic monomer having a conjugated diene is 1,3-butadiene, 1,3-isoprene, 1,4-dimethyl-1,3-butadiene, 1,2-dimethyl-1,3-butadiene, 1,3-dimethyl-1,3-butadiene, 1,2,3-trimethyl-1,3-butadiene, 1,3,5-hexatriene, alloocimene, etc.

The aliphatic conjugated diene-based resin can be obtained by polymerizing an aliphatic monomer having a conjugated diene, or by copolymerizing the aliphatic monomer having a conjugated diene with another monomer.

As such other monomer, ethylenically unsaturated carboxylic acid, a sulfonic acid group-containing monomer, a nitrile group-containing monomer, an aromatic vinyl monomer, a monomer having a thermally crosslinkable group, an aromatic vinyl compound, etc., may be used.

Specifically, the aliphatic conjugated diene-based resin may be a 1,3-butadiene polymer, a diene-based rubber, a thermoplastic elastomer, or these random copolymers, these block copolymers and these hydrogenated or acid modified products. The aliphatic conjugated diene-based resin may optionally contain anti-aging agents such as a combination of a phenol-based compound and a thioether-based compound or a combination of a phenol-based compound and a phosphite-based compound.

(b4) Resin Different from Resins (b1) to (b3)

The resin (b4) different from the resins (b1) to (b3) is, for example, an olefin resin, a fluorine resin, a sulfonic acid group-containing resin, a cellulose resin, etc. The resin (b4) may be in the form of particles of an organic polymer, a graft polymer, a polymer latex, a silicon-containing polymer, etc.

Specifically, the olefin-based resin is an independent polymer of an olefin compound or a copolymer of the independent polymer with a copolymerizable monomer such as polyethylene, polypropylene, poly-1-butene, an ethylene•α-olefin copolymer, a propylene•α-olefin copolymer, an ethylene•propylene•diene copolymer (EPDM), ethylene•propylene•styrene copolymer, etc.

As for the fluorine resin, polytetrafluoroethylene, polyvinylidene fluoride, polychlorotrifluoroethylene, polyvinyl fluoride, a tetrafluoroethylene-ethylene copolymer, a perfluoroalkoxy fluorine resin, a tetrafluoroethylene-hexafluoropropylene copolymer, an ethylene-chlorotrifluoroethylene copolymer, a vinylidene fluoride rubber, a tetrafluoroethylene-propylene copolymer, etc. are included.

Examples of a sulfonic acid group-containing resin include sulfonated polymers, such as sulfonated polyether sulfone, sulfonated polysulfone, etc.

As the cellulose resin, for example, a cellulose semisynthetic polymer, a sodium salt or ammonium salt thereof, etc., are included, for example. The cellulose-based resin may have a sulfur atom, a cationic group, an acid group, a propargyl group, etc.

Examples of a silicon-containing polymer include dimethylpolysiloxane, diphenylpolysiloxane, dihydroxypolysiloxane, etc.

[Particle of Polymer Having Core-Shell Structure]

A particle of a polymer having a core-shell structure has a core portion containing a polymer and a shell portion containing a polymer. Moreover, the resin having a core-shell structure preferably has a segment compatible with a nonaqueous electrolyte and a segment not compatible with it. As a polymer of the core portion or shell portion, the resins (b1) to (b4) described above can be used.

The particle of a polymer having a core-shell structure can be polymerized, for example, using a monomer of the polymer forming the core portion and a monomer of the polymer forming the shell portion, and changing stepwise a ratio of these monomers with the duration of time. Specifically, first, the monomers of the polymer forming the core portion are polymerized to produce a seed polymer particle. The seed polymer particle forms a core consisted of the particles. Subsequently, in the polymerization system containing the seed polymer particles, the monomers of the polymer forming the shell portion are polymerized. Then the particle of the polymer having a core-shell structure is obtained by forming the shell portion on the surface of the core portion. A reaction medium, a polymerization initiator, a surfactant, etc., may be used as necessary.

(Core Portion)

The core portion of particles generally has a softening start point or a decomposition point at 175° C. or higher, preferably 220° C. or higher, and more preferably 225° C. or higher. The core portion having the softening start point or decomposition point in a temperature range of 175° C. or higher is difficult to deform under a use environment and during heat press of a secondary battery and can suppress clogging of pores of a microporous membrane. Moreover, since it can suppress reduction in the rigidity of the microporous membrane, shrinkage of a separator can also be suppressed. Therefore, it is possible to stably prevent a short circuit at an elevated temperature environment. Moreover, the upper limit of the softening start point or decomposition point of the core portion is not particularly restricted, but usually 450° C. or lower.

A method for measuring the softening start point will be described below.

First, 10 mg of a sample weighed is placed on an empty aluminum pan, and the sample is subjected to thermal analysis to obtain a DSC curve under normal temperature and normal humidity, using a differential thermal analyzer with other empty aluminum pan as reference in a measurement temperature range of −100° C. to 500° C. at a rate of temperature rise of 10° C./minute. In the temperature rise process, the crossing point is a glass transition point (Tg) between a baseline just before the observed endothermic peak of the DSC curve, at which the differential signal (DDSC) becomes 0.05 mW/minute/mg or more, and a tangent of the DSC curve at the inflection point that appears first after the endothermic peak. Furthermore, a temperature higher than the glass transition point by 25° C. is taken as the softening start point.

It is noted that when the decomposition point is lower than the softening start point of the core portion of a non-conductive particle, there often occurs a case that the softening start point is not observed due to its decomposition.

A method for measuring the decomposition point will be described below.

In a nitrogen atmosphere, a sample to be measured is heated from 30° C. at a rate of temperature rise of 10° C./minute using a differential thermal-thermal weight simultaneous measurement apparatus. At this time, the temperature at which the weight loss ratio reaches 10% by weight is taken as the decomposition point.

It is noted that when both the softening start point and the decomposition point of the core portion of the particle are observed, the lower temperature is regarded as the softening start point of the core portion.

Examples of a polymer forming the core portion include highly crosslinked polymers of resins (b1) to (b4). Due to the high degree of crosslinks the molecular motion of the polymer is suppressed even at a temperature above the glass transition point of the polymer, and thereby the shape of the core can be maintained.

A polymer forming the core portion is preferably obtained by polymerizing a crosslinkable vinyl monomer. As the crosslinkable vinyl monomer, for example, a compound having two or more of copolymerizable double bonds and preferably two double bonds, is included. Moreover, one kind of the crosslinkable vinyl monomers may be used singly, or two or more kinds may be used in combination at an arbitrary ratio.

Examples of a suitable crosslinkable vinyl monomer include a non-conjugated divinyl compound and a polyvalent acrylate compound.

Examples of the non-conjugated divinyl compound include divinyl benzene, etc.

Examples of polyvalent acrylates include diacrylate compounds, such as polyethylene glycol diacrylate, 1,3-butylene glycol diacrylate, 1,6-hexane glycol diacrylate, neopentyl glycol diacrylate, polypropylene glycol diacrylate, 2,2'-bis (4-acryloxypropyloxyphenyl) propane,2,2'-bis (4-acryloxydiethoxyphenyl) propane, etc.; triacrylate compounds, such as trimethylolpropane triacrylate, trimethylolethane triacrylate, tetramethylolmethane triacrylate, etc.; tetraacrylate compounds, such as tetramethylolmethane tetraacrylate, etc.; dimethacrylate compounds such as ethylene glycol dimethacrylate, diethylene glycol dimetacrylate, triethylene glycol dimethacrylate, polyethylene glycol dimethacrylate, 1,3-butylene glycol dimethacrylate, 1,4-butylene glycol dimethacrylate, 1,6-hexane glycol dimethacrylate, neopentyl glycol dimethacrylate, dipropylene glycol dimethacrylate, polypropylene glycol dimethacrylate, 2,2'-bis (4-methacryloxydiethoxyphenyl) propane, etc.; trimethacrylate compounds, such as trimethylolpropane trimethacrylate, trimethyloletane trimethacrylate, etc.

The proportion of the crosslinkable vinyl monomer is preferably 20% by weight or more, more preferably 25% by weight or more, and still more preferably 30% by weight or more, based on the total monomers of the polymer forming the core portion. By setting the proportion of the crosslinkable vinyl monomer to 20% by weight or more, hardness, heat resistance and solvent resistance of the core portion can be improved. Moreover, the upper limit is usually preferably 100% by weight or less, more preferably 98% by weight or less, and still more preferably 95% by weight or less. Here, an amount of the crosslinkable vinyl monomer is, for example, is that of a pure product thereof excluding diluents and impurities.

(Shell Portion)

The softening start point of the shell portion of particles is preferably 85° C. or higher, more preferably 87° C. or higher, still more preferably 89° C. or higher, and on the other hand, preferably 145° C. or lower, more preferably 125° C. or lower, and more preferably below 115° C. When the softening start point is 85° C. or higher, the blocking resistance of a microporous membrane can be improved. In addition, since the shell portion comes to exhibit resistance to melt at the operating temperature of the secondary battery, clogging of the pores of a separator can be suppressed, whereby the rate characteristics of a secondary battery can be improved. Moreover, since the shell portion can easily melt during heat press due to the softening start point being 145° C. or lower, the adhesiveness of the separator is improved, so that the cycle characteristics of the secondary battery are improved.

As for a polymer forming the shell portion, a polymer containing a (meth)acrylate unit is preferably used. The electrical stability of a porous film can be improved by forming the shell portion with the polymer containing a (meth)acrylate unit. Examples of acrylate include methyl acrylate, ethyl acrylate, butyl acrylate, 2-ethylhexyl ethyl acrylate, etc. Examples of methacrylate include methyl methacrylate, butyl methacrylate, 2-ethylhexyl methacrylate, etc.

A ratio of the (meth)acrylate unit in a polymer forming the shell portion is preferably 50% by weight or more, more preferably 60% by weight or more, further preferably 70% by weight or more, and 100% by weight or less from the viewpoint of electrical stability.

(Particle Size of Polymer Having Core-Shell Structure)

The number-average particle size of a particle of the polymer having a core-shell structure is preferably 30 nm or more, more preferably 50 nm or more, still more preferably 100 nm or more, and on the other hand, preferably 1,500 nm or less, more preferably 1,200 nm or less, and still further preferably 1,000 nm or less. By setting the number-average particle size of the particle to such range, it is possible to form a gap between the particles to such an extent that the movement of ions is not inhibited while the particles have a contact part with each other. Therefore, the strength of a microporous membrane can be improved, and a short circuit of the battery can be prevented, as well as cycle characteristics of a secondary battery can be improved.

The number-average particle size of the particles can be measured as follows. 200 particles are arbitrarily selected from a photograph taken at a magnification of 25,000 using a field emission scanning electron microscope. When the longest side of the particle image is La and the shortest side is Lb, (La+Lb)/2 is a particle size. The average particle size of 200 particles is determined as the average particle size.

The thickness of the shell portion is preferably 3% or more, more preferably 5% or more, still more preferably 7% or more, and preferably 18% or less, more preferably 16% or less, and more preferably 14% or less, with respect to the number-average particle size of the particles. The adhesiveness of a separator can be improved as the thickness is 3% or more with respect to the thickness number-average particle size of the shell portion, and cycle characteristic of a secondary battery can be improved. In addition, when the thickness of the shell portion is 18% or less with respect to the number-average particle size, the pore size of the separator can be increased to such an extent that the movement of ions is not hindered, thereby improving the rate characteristics of the secondary battery. Moreover, since the core portion can be relatively enlarged by thinning the shell portion, the rigidity of the particles can be enhanced. From this reason, the rigidity of a microporous membrane can be enhanced to suppress the shrinkage of the separator.

The thickness (S) of the shell portion can be calculated from, for example, the number-average particle size (D1) of a seed polymer particle before forming the shell portion and the number-average particle size (D2) of the non-conductive particle after forming the shell portion, by using the following formula:

$$(D2-D1)/2=S$$

(Amount of Particle of Polymer Having Core-Shell Structure)

The content ratio of particles of the polymer having a core-shell structure in a porous membrane is preferably 70% by weight or more, more preferably 75% by weight or more, still more preferably 80% by weight or more, and usually 98% by weight or less, more preferably 96% by weight or less, and more preferably 94% by weight or less. When the content ratio of the particles falls within the above range, the particles can have a contact part with each other and form a gap between the particles to such an extent that the migration of ions is not inhibited, thereby improving a separator strength and stably preventing a short circuit.

When a separator contains the inorganic particles for a nonaqueous electrolyte battery, the content of the inorganic particles for the nonaqueous electrolyte battery in the separator is preferably, for example, 0.1 g/m$^2$ or more per area of the separator, and more preferably 0.5 g/m$^2$ or more, from the viewpoint of favorably securing the effects of its use. However, when the content of the inorganic particles for the nonaqueous electrolyte battery in the separator is too great, the separator becomes thick, which tends to cause a decrease in the energy density of the battery or an increase in the internal resistance. Therefore, the content of the inorganic particles for a nonaqueous electrolyte battery in the separator is, for example, preferably 15 g/m$^2$ per area of the separator or less, and more preferably 10 g/m$^2$ or less.

Furthermore, when the separator has a porous layer containing the inorganic particles for a nonaqueous electrolyte battery, the content of the inorganic particles for a nonaqueous electrolyte battery in the entire volume (whole volume excluding a pore portion) of the constituent components of the porous layer is preferably 1% by volume or more, more preferably 5% by volume or more, and 100% by volume or less, from the viewpoint of securing the effect of its use.

Moreover, the separator can also contain the other inorganic particles or resin fine particles. By containing these fine particles in the separator, for example, the shape stability of the entire separator at elevated temperatures can be further enhanced.

Such other inorganic particles may be preferably at least one of the inorganic particles selected from the group consisting of anion adsorbents, such as a layered double hydroxide (Mg—Al type, Mg—Fe type, Ni—Fe type, Li—Al type), a layered double hydroxide-alumina silica gel complex, boehmite, alumina, zinc oxide, lead oxide, iron oxide, iron oxyhydroxide, hematite, bismuth oxide, tin oxide, titanium oxide, zirconium oxide, etc., cation adsorbents, such as zirconium phosphate, titanium phosphate, apatite, non-basic titanate, niobate, niobate•titanate, zeolite, carbonates or sulfates, such as calcium sulfate, magnesium sulfate, aluminum sulfate, gypsum, barium sulfate, etc., oxide-based ceramics, such as alumina trihydrate (ATH), fumed silica, precipitated silica, zirconia, yttria, etc., nitride-based ceramics such silicon nitride, titanium nitride, boron nitride, etc., layered silicates, such as silicon carbide, talc, dickite, nacrite, halloysite, pyrophyllite, montmorillonite, sericite, amesite, bentonite, etc., asbestos, diatomaceous earth, glass fiber, synthesized layered silicates, such as mica or fluoromica, and zinc borate.

In particular, the aforementioned other inorganic particles are preferably an anion adsorbent and/or a cation adsorbent. Thus, the HF adsorption capacity of the basic inorganic particles is further enhanced due to the other inorganic particles described above being the anion adsorbent or cation adsorbent.

There is no restriction on the non-basic anion adsorbent, and examples thereof include, a layered double hydroxide (Mg—Al type, Mg—Fe type, Ni—Fe type, Li—Al type), a layered double hydroxide-alumina silica gel complex, boehmite, alumina, zinc oxide, lead oxide, iron oxide, iron oxyhydroxide, hematite, bismuth oxide, tin oxide, titanium oxide, zirconium oxide, etc. From the viewpoint of relatively low water content and preventing battery swelling, as the anion adsorbent, boehmite, alumina, zinc oxide, lead oxide, iron oxide, iron oxyhydroxide, hematite, lanthanum oxide, bismuth oxide, tin oxide, titanium oxide, cerium oxide and zirconium oxide, are preferred. The anion adsorbent may be used singly and two or more types thereof may be used in combination.

In particular, from the viewpoint of relatively low water content and preventing battery swelling, boehmite, alumina, zinc oxide, lead oxide, iron oxide, iron oxyhydroxide, hematite, lanthanum oxide, bismuth oxide, tin oxide, titanium oxide, cerium oxide, and zirconium oxide, are preferred.

Examples of the non-basic cation adsorbent include zirconium phosphate, titanium phosphate, apatite, non-basic titanate, niobate, niobate•titanate, etc.

Moreover, with regard to the resin fine particles, they have preferably heat resistance, electrical insulation, and stability for a nonaqueous electrolyte in a battery, and is composed of an electrically stable resin that has resistance to oxidation and reduction for an operating voltage range of the battery. Examples of a resin forming such resin fine particles include at least one type of crosslinked resins, such as a styrene resin (polystyrene, etc.), a styrene butadiene rubber, an acrylic resin (polymethyl methacrylate, etc.), polyalkylene oxide (polyethylene oxide, etc.), a fluorine resin (polyvinylidene difluoride, etc.) and derivatives thereof, urea resins, polyurethanes, etc. As the resin fine particles, one of the resins exemplified above may be used singly, or two or more thereof may be used in combination. In addition, the resin fine particles may contain publicly known additives that can be added to the resin, for example, such as an antioxidant, etc. as necessary.

The shape of the other inorganic particles or resin fine particles may be any of plate-like, scale-like, acicular, columnar, spherical, polyhedral, or massive shape, etc. The inorganic particles or resin fine particles having such shape may be used singly, two or more thereof may be used in combination. From the viewpoint of improvement of permeability, a polyhedron shape constituted with a plurality of faces is preferable.

Further, with regard to a particle size of the other inorganic particles or resin fine particles, the average particle diameter (D50) thereof is preferably 0.1 µm to 4.0 µm, more preferably 0.2 µm to 3.5 µm, and furthermore preferably 0.4 µm to 3.0 µm. By adjusting the average particle size to such a range, thermal shrinkage at elevated temperatures tends to be further suppressed.

In a case where the other inorganic particles or resin fine particles are contained, these fine particles may be contained in, for example, (i) a porous layer containing the inorganic particles for a nonaqueous electrolyte battery, or (ii) a porous layer (hereinafter referred to as "other layer") (a porous layer containing inorganic particles or resin fine particles other than the basic inorganic particles for a nonaqueous electrolyte battery), different form the porous layer containing the inorganic particles for a nonaqueous electrolyte battery and a nonwoven fabric or a microporous membrane to form a base material.

In a case where the other inorganic particles or the resin particles are contained in (i) a layer containing the inorganic particles for a nonaqueous electrolyte battery, the content of the other inorganic particles or resin fine particles is preferably adjusted so that the content of the inorganic particles for a nonaqueous electrolyte battery should be within the preferred range described above.

Moreover, in the case where the other inorganic particles or resin fine particles are contained in (ii) other layer, the porous layer containing these fine particles can be placed, for example, in contact with one side (side opposite to a surface in contact with a porous layer mainly containing the inorganic particles for a nonaqueous electrolyte battery) of a nonwoven fabric or a microporous membrane to form a base material, placed between the porous layer containing the inorganic particles for a nonaqueous electrolyte battery and the base material, or placed on a porous layer which contains the inorganic particles for a nonaqueous electrolyte particle placed on the surface of the substrate, at the side opposite to a surface in contact with the substrate.

Moreover, other layer may be integrated with a nonwoven fabric or a woven fabric serving as a base material, or a porous layer containing the inorganic particles for a nonaqueous electrolyte battery or may be present as an independent membrane that is combined with another layer (independent membrane) in a battery to constitute a separator.

In a case where the other inorganic particles or resin fine particles are added to (ii) other layer, the content of these fine particles in the porous layer containing these is preferably 5% by volume or more with respect to the total volume of the constituent components (the total volume excluding the pore portion) of such layer, more preferably 10% by volume or more, and further preferably 50% by volume or more.

Further, when the other inorganic particles or resin fine particles are added to (ii) other layer, it is preferable that such layer should contain a binder. As for the binder, various binders listed previously for the porous layer containing the inorganic particles for a nonaqueous electrolyte battery can be used identically.

The content of the binder in other layer is preferably 0.5% by volume or more with respect to the total volume of the constituent components (the total volume excluding the pore portion) of such layer. Therefore, the content of the other particles and resin fine particles in other layer is preferably 99.5% by volume or less.

When the nonaqueous electrolyte battery according to the present embodiment contains the inorganic particles for the battery at a location other than a separator, as such a separator, a separator, which uses the nonwoven fabric or the microporous membrane described above as a base material, and has a porous layer containing mainly the other inorganic particles or resin fine particles on one side or both sides thereof, may be used.

It is noted that the other inorganic particles or resin fine particles may be contained in an outer package.

A porosity of the separator used for a nonaqueous electrolyte battery according to the present embodiment is preferably 30% or more and more preferably 40% or more in a dried state of the separator in order to secure the holding amount of a nonaqueous electrolyte, and to improve the ion permeability. On the other hand, the porosity of the separator is preferably 80% or less and more preferably 70% or less in a dry state of the separator from the viewpoint of securing strength of the separator and prevention of internal short circuit. The porosity P (%) of a separator may be calculated from the thickness of the separator, the weight per area, and the density of a constituent component by summing up the values of each component i using the following equation:

$$P = [1 - (m/t)/(\Sigma a_i \cdot \rho_i)] \times 100$$

{wherein, $a_i$ is the ratio of a component i with respect to the total weight as 1; $\rho_i$ is the density (g/cm$^3$) of a component i; m is the weight per unit area of the separator (g/cm$^2$); and t is the thickness (cm) of the separator.}.

A thickness of the separator in the present embodiment is preferably from 2 μm to 200 μm, more preferably from 3 μm to 100 μm, and further preferably from 4 μm to 30 μm in both a single layer structure and a multilayer structure. When the thickness of the separator is 2 μm or more, the mechanical strength of the separator tends to be enhanced. Further, when the thickness of the separator is 200 μm or less, the volume occupied by the separator in a battery is reduced, so that a nonaqueous electrolyte battery tends to have a higher capacity, and the ion permeability tends to be improved.

An air permeability of the separator in the present embodiment is preferably from 10 seconds/100 cc to 500 seconds/100 cc, more preferably from 20 seconds/100 cc to 450 seconds/100 cc, and further preferably from 30 seconds/100 cc to 450 seconds/100 cc. When the air permeability is 10 seconds/100 cc or more, there is a tendency that the self-discharge is reduced in using the separator for a nonaqueous electrolyte battery. Further, when the air permeability is 500 seconds/100 cc or less, better charge and discharge characteristics tend to be obtained.

Moreover, when the separator has a porous layer containing the inorganic particles for a nonaqueous electrolyte battery and a nonwoven fabric or a microporous membrane as a base material, the thickness of the porous layer containing the inorganic particles for a nonaqueous electrolyte battery is preferably from 1 μm to 10 μm.

Further, when the separator has the porous layer containing the inorganic particles for a nonaqueous electrolyte battery and the nonwoven fabric or microporous membrane as a base material, or has in addition to these layers, another layer (a layer containing mainly the other inorganic particles or resin fine particles), the thickness of the nonwoven fabric or the porous layer to form the base material is preferably from 5 μm to 40 μm.

Further, when the separator has other layer, the thickness of such porous layer is preferably from 1 μm to 10 μm.

The porous layer containing the inorganic particles for a nonaqueous electrolyte battery may be formed through a process in which a composition (such as a paste, or a slurry) is prepared by dispersing or dissolving the inorganic particles for a nonaqueous electrolyte battery, a binder, etc., in water or an organic solvent, coated to an area where such a porous layer is to be formed, and then dried, or the composition is coated to the base material such as a resin film, and dried, and then the coated film is peeled to form an independent film.

Further, other layer may also be formed through a process in which a composition (such as a paste, or a slurry) is prepared by dispersing or dissolving the particle, binder, etc., in water or an organic solvent, coated to an area where such a porous layer is to be formed, and then dried; or the composition is coated to the base material such as a resin film, and dried, and then the coated film is peeled to form an independent film.

A porous layer containing the inorganic particles for a nonaqueous electrolyte battery preferably further contains an aqueous polymer. When the aqueous polymer is contained, HF diffuses into the polymer and has a likelihood of contact with the inorganic particles for a nonaqueous electrolyte battery, and the particle can effectively remove HF. A publicly known aqueous dispersant or aqueous thickener that is generally known as an aqueous dispersant or aqueous thickener, can be used as the aqueous polymer.

Examples of the aqueous dispersant include cationic surfactants, such as an organosiloxane polymer KP 341 (manufactured by Shinetsu Chemical Co., Ltd.), methacrylic acid or acrylic acid (co)polymer Polyflow No. 75, No. 90, No. 95 (all manufactured by Kyoeisha Chemical Co., Ltd.), W001 (Yusho Co., Ltd.), etc.; nonionic surfactants, such as polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate, sorbitan fatty acid ester, etc.; anion surfactants, such as W004, W005, W017 (all manufactured by Yusho Co., Ltd.), etc.: EFKA-46, EFKA-47, EFKA-47EA, EFKA Polymer 100, EFKA Polymer 400, EFKA Polymer 401, EFKA Polymer 450 (all manufactured by Ciba Specialty Chemicals Inc.); polymer dispersants, such as Disperse Aid 6, Disperse Aid 8, Disperse Aid 15, Disperse Aid 9100, SN Dispersant 5040, 5033, 5034, 5468, 5020 (all manufactured by San Nopco Co., Ltd.), Solsperse dispersants, such as Solsperse 3000, 5000, 9000, 12000, 13240, 13940, 17000, 24000, 26000, 28000, and 41000 (all manufactured by Lubrizol Corporation), etc.; dispersants, such as ADEKA PLURONIC L31, F38, L42, L44, L61, L64, F68, L72, P95, F77, P84, F87, P94, L101, P103, F108, L121, P-123 (all manufactured by ADEKA Corporation), IONETT S-20 (manufactured by Sanyo Chemical Industries, Ltd.), DISPERBYK 101, 103, 106, 108, 109, 110, 111, 112, 116, 118, 130, 140, 142, 162, 163, 164, 166, 167, 170, 171, 174, 176, 180, 182, 184, 190, 191, 194 N, 2000, 2001, 2010, 2015, 2050, 2055, 2150, 2152, 2155, 2164 (all manufactured by BYK Japan KK), etc.; dispersants, such as DEMOL EP, Poise 520, Poise 521, Poise 530, Poise 535, DEMOL P (all manufactured by Kao Corporation), etc.; polycarboxylic acid dispersants, such as Aron T-50, -6012, A-6017, AT-40H, A-6001, A-30SL, A-6114, A-210, SD-10, A-6712, A-6330, CMA-101, JULIMER (registered trademark) AC-10 NPD (all manufactured by Toagosei Co., Ltd.), Nuosperse FX-605, FX-609, FX-600, FX-504 (all manufactured by Elementis plc), etc. Moreover, as a dispersant other than the aforementioned dispersants, an oligomer or a polymer which has a polar group in the molecular end or the side chain, such as an acrylic copolymer, etc. is included. The dispersant may be used singly or in combination of two or more thereof.

Examples of the aqueous thickener include SEPIGEL 305, NS, EG, FL, SEPIPLUS 265, S, 400, SEPINOV EMT 10, P88, SEPIMAX ZEN (all manufactured by Seiwa Kasei Co., Ltd.); Aron A-10H, A-20P-X, A-20L, A-30, A-7075, A-7100, A-7185, A-7195, A-7255, B-300K, B-500K, JULIMER (registered trademark) AC-10LHPK, AC-10SHP, RHEODIC 260H, 845H, JUNLON PW-120 (all manufactured by Toagosei Co., Ltd.); DISPERBYK 410, 411, 415, 420, 425, 428, 430, 431, 7410ET, 7411ES, 7420ES, OPTI-FLO-L1400 (all manufactured by BYK Japan KK), Cosquat GA 468 (manufactured by Osaka Organic Chemical Industry Co., Ltd.), fibrous derivative materials (such as carboxymethylcellulose, methylcellulose, hydroxycellulose, etc.), protein materials (such as casein, sodium caseinate, ammonium caseinate, etc.), alginic acid-based materials (sodium alginate, etc.), polyvinyl materials (polyvinyl alcohol, polyvinyl pyrrolidone, a polyvinyl benzyl ether copolymer, etc.), polyacrylic acid materials (sodium polyacrylate, a polyacrylic acid-polymethacrylic acid copolymer, etc.), polyether materials (pluronic polyether, polyether dialkyl ester, polyether dialkyl ether, a polyether urethane modified product, a polyether epoxy modified product, etc.), and maleic anhydride copolymer materials (a partially esterified product of vinyl ether-maleic anhydride copolymer, half ester of drying oil fatty acid allyl alcohol ester-maleic anhydride), etc. As the thickener, besides the aforementioned thickeners, a polyamide wax salt, acetylene glycol, zentan gum, an oligomer or a polymer having a polar group at the molecular end or the side chain may be included.

The thickener may be used singly or in combination of these two or more.

The content of the aqueous polymer in a porous layer that contains the inorganic particles for a nonaqueous electrolyte battery and is formed into a film, is preferably 0.1% by weight to 100% by weight with respect to the total solid content of the inorganic particles for a nonaqueous electrolyte battery, and more preferably in a range of 0.2% by weight to 10% by weight.

The separator containing the basic inorganic particles according to the present embodiment is, as described below, preferably a porous layer containing the inorganic particles, wherein a HF concentration decreases to less than 90% of an initial HF concentration in 5 minutes at 23° C. after putting the separator for a nonaqueous electrolyte battery into 100 parts by weight of a cyclic and/or a linear carbonate solution having a HF concentration of 10 to 10,000 ppm and containing 0.1 to 6.0 mol/L of $LiPF_6$ such that the amount of the basic inorganic particles for a nonaqueous electrolyte solution is [HF concentration (ppm)]/100 parts by weight. The HF concentration decreases to more preferably less than 85%, and still more preferably less than 80%.

For example, the aforementioned basic inorganic particles are preferably basic inorganic particles, wherein a HF concentration decreases to less than 720 ppm in 5 minutes at 23° C. after putting the separator containing the basic inorganic particles into 100 parts by weight of a nonaqueous electrolyte solution prepared by diluting a cyclic and/or a linear carbonate solution containing 1 mol/L of $LiPF_6$ with distilled water to have a HF concentration of 800 ppm, such that the amount of the basic inorganic particles is 8 parts by weight. In this example, the HF concentration decreases more preferably to less than 680 ppm and furthermore preferably less than 640 ppm.

[Positive Electrode]

It is preferable that a positive electrode includes a positive electrode active material, a conductive material, a binder, and a current collector.

As a positive electrode active material which may be contained in the positive electrode, publicly known ones capable of electrochemically intercalating and releasing a lithium ion may be used. Among them, a material containing lithium is preferable as the positive electrode active material. Examples of the positive electrode active material include:
an oxide represented by the following Formula (1):

$$Li_xMn_{2-y}M_yO_z \quad (1)$$

{wherein, M represents at least one element selected from the group consisting of transition metal elements; $0<x\leq1.3$; $0.2<y<0.8$; and $3.5<z<4.5$.} a layered oxide represented by the following Formula (2):

$$Li_xM_yO_z \quad (2)$$

{wherein, M represents at least one element selected from the group consisting of transition metal elements; $0<x\leq1.3$; $0.8<y<1.2$; and $1.8<z<2.2$.} a spinel type oxide represented by the following Formula (3):

$$LiMn_{2-x}Ma_xO_4 \quad (3)$$

{wherein, Ma represents at least one element selected from the group consisting of transition metal elements; and $0.2\leq x\leq0.7$.} a layered oxide positive electrode active material containing excessive Li represented by the following Formula (6), which is a complex oxide of an oxide represented by the following Formula (4) and an oxide represented by the following Formula (5):

$$Li_2McO_3 \quad (4)$$

{wherein, Mc represents at least one element selected from the group consisting of transition metal elements.}

$$LiMdO_2 \quad (5)$$

{wherein, Md represents at least one element selected from the group consisting of transition metal elements.}

$$zLi_2McO_3\text{-}(1\text{-}z)LiMdO_2 \quad (6)$$

{wherein, Mc and Md have respectively the same meanings as Mc and Md in Formulas (4) and (5), and $0.1\leq z\leq0.9$.} an olivine type positive electrode active material represented by the following Formula (7):

$$LiMb_{1-y}Fe_yPO_4 \quad (7)$$

{wherein, Mb represents at least one element selected from the group consisting of Mn and Co; and $0\leq y\leq1.0$.}, and a compound represented by the following Formula (8):

$$Li_2MePO_4F \quad (8)$$

{wherein, Me represents at least one element selected from the group consisting of transition metal elements.}. These positive electrode active materials may be used singly, or two or more thereof may be used in combination.

Among the aforementioned positive electrode active materials, those operable at a higher potential to increase the energy density of a battery are preferable. Furthermore, at least one selected from the group consisting of the spinel type lithium manganese composite oxide represented by Formula (3), and the layered compound represented by Formula (2) is preferably used, because the nonaqueous electrolyte battery according to the present embodiment can effectively adsorb the root cause, i.e., HF which may dissolve out from the positive electrode active material and deposit on the negative electrode to deteriorate the battery characteristics or cause short circuit, so that deterioration of the battery performance may be suppressed.

In order to form a positive electrode used in the present embodiment, a conductive material, a binder, and a current collector known in the art may be used.

A method for adding the inorganic particles for a nonaqueous electrolyte battery to the positive electrode is not restricted, however, for example, a method of adding the inorganic particles for a nonaqueous electrolyte battery into a positive electrode mixture layer consisting of the positive electrode active layer and a binder, or a method of forming a porous layer containing the inorganic particles for a nonaqueous electrolyte battery on a surface of the positive electrode (in the positive electrode mixture layer or on the surface of the positive electrode mixture layer), may be applied. In the case of the former method, the inorganic particles may be in the state of being mixed with the positive electrode active material or contained so as to be coated on a surface of the positive electrode active material. In the case of the latter method, the porous layer containing the inorganic particles for a nonaqueous electrolyte battery may be formed by the same method as in the case of the porous layer containing the inorganic particles for a nonaqueous electrolyte battery described above for the multilayer structure separator, and the constitution may be also the same constitution as the porous layer.

When the positive electrode contains the inorganic particles for a nonaqueous electrolyte battery, the content of the inorganic particles for a nonaqueous electrolyte battery in the positive electrode is preferably 0.5% by volume or more with respect to the total volume (the total volume excluding the pore portion) of the constituent components of the positive electrode excluding the current collector from the viewpoint of favorably securing the effect of its use, and more preferably 1% by volume or more. On the other hand, when the content of the inorganic particles for a nonaqueous electrolyte battery in the positive electrode is too great, it may be apt to constitute a cause of reduction in the energy density of the battery or increase in internal resistance. Therefore, the content of the inorganic particles for a nonaqueous electrolyte battery in the positive electrode is preferably, for example, 10% by volume or less with respect to the total volume (the total volume excluding the pore portion) of the constituent components of the positive electrode excluding the current collector, and more preferably 6% by volume or less.

Further, in the positive electrode mixture layer with respect to the positive electrode, when the positive electrode mixture layer does not contain the inorganic particles for a nonaqueous electrolyte battery, it is preferable that the content of the positive electrode active material is adjusted to from 87% by weight to 99% by weight, and the content of the conductive auxiliary agent is adjusted to from 0.5% by weight to 10% by weight, and/or the content of the binder is adjusted to from 0.5% by weight to 10% by weight.

On the other hand, when the positive electrode mixture layer contains the inorganic particles for a nonaqueous electrolyte battery, it is preferable that the content of the positive electrode active material is adjusted to from 87% by weight to 99% by weight with respect to the total amount of components other than the inorganic particles for a nonaqueous electrolyte battery in the positive electrode mixture layer as 100% by weight, the content of the conductive auxiliary agent is adjusted to from 0.5% by weight to 10% by weight-%, and/or the content of the binder is adjusted to from 0.5% by weight to 10% by weight.

[Negative Electrode]

It is preferable that the negative electrode according to the present embodiment includes a negative electrode active material, a binder, and a current collector.

As the negative electrode active material to be contained in the negative electrode, a publicly known one capable of electrochemically intercalating and releasing lithium ions may be used. There is no particular restriction on such negative electrode active material, and, for example, carbon materials, such as a graphite powder, a mesophase carbon fiber, a mesophase microsphere, etc.; and a metal, an alloy, an oxide, and a nitride, are preferable. Each may be used singly, or two or more thereof may be used in combination.

As the binder to be contained in the negative electrode, a publicly known binder capable of binding at least two of the negative electrode active materials, a conductive material to be contained in the negative electrode, and the current collector to be contained in the negative electrode, may be used. Although there is no particular restriction on such binder, preferable examples thereof may include carboxymethylcellulose, a crosslinked rubber latex of styrene/butadiene, an acrylic latex, and polyvinylidene fluoride. These may be used singly, or two or more thereof may be used in combination.

Although there is no particular restriction on a current collector to be included in the negative electrode, examples thereof may include metal foils, such as copper, nickel, and stainless steel; an expanded metal; a punched metal; a foamed metal; a carbon cloth; and a carbon paper. These may be used singly, or two or more thereof may be used in combination.

When adding the inorganic particles for a nonaqueous electrolyte battery into the negative electrode, a conventionally known method may be used without particular limitation. There are, for example, a method of adding the inorganic particles for a nonaqueous electrolyte battery in a negative electrode mixture layer consisting of the negative electrode active material and the binder, or a method of forming a porous layer containing the inorganic particles for a nonaqueous electrolyte battery on a surface of the negative electrode (in the negative electrode mixture layer, or on a surface of the negative electrode mixture layer). In the case of the former method, the inorganic particles may be in a state of being mixed with the negative active material or contained so as to be coated on a surface of the negative active material. In the case of the latter method, the porous layer containing the inorganic particles for a nonaqueous electrolyte battery may be formed by the same method as in the case of the porous layer containing the inorganic particles for a nonaqueous electrolyte battery described above for the multilayer structure separator, and the constitution may be also the same constitution as the porous layer.

When the negative electrode contains the inorganic particles for a nonaqueous electrolyte battery, the content of the inorganic particles for a nonaqueous electrolyte battery in the negative electrode is preferably 1.5% by volume or more with respect to the total volume (the total volume excluding the pore portion) of the constituent components of the negative electrode excluding the current collector from the viewpoint of favorably securing the effect of its use, and more preferably 2% by volume or more. However, when the amount of the inorganic particles for a nonaqueous electrolyte battery in the negative electrode is too great, it may be apt to constitute a cause of reduction in the energy density of the battery or increase in internal resistance. Therefore, the content of the inorganic particles for a nonaqueous electrolyte battery in the negative electrode is preferably 25% by volume or less with respect to the total volume (the total volume excluding the pore portion) of the constituent components of the negative electrode excluding the current collector, and more preferably 15% by volume or less.

Further, in the negative electrode mixture layer with respect to the negative electrode, when the negative electrode mixture layer does not contain the inorganic particles for a nonaqueous electrolyte battery, it is preferable that the content of the negative electrode active material is adjusted to from 88% by weight to 99% by weight, and/or the content of the binder is adjusted to from 0.5% by weight to 12% by weight. When a conductive auxiliary agent is used, the content of the conductive auxiliary agent is preferably adjusted to from 0.5% by weight to 12% by weight.

On the other hand, when the negative electrode mixture layer contains the inorganic particles for a nonaqueous electrolyte battery, it is preferable that the content of the negative electrode active material is adjusted to from 68% by weight to 99% by weight with respect to the total amount of components other than the inorganic particles for a nonaqueous electrolyte battery in the negative electrode mixture layer as 100% by weight, and/or the content of the binder is adjusted to from 0.5% by weight to 12% by weight. When the conductive auxiliary agent is used, the content of the conductive auxiliary agent is preferably adjusted to from 0.5% by weight to 12% by weight.

[Nonaqueous Electrolyte]

As the nonaqueous electrolyte used in the present embodiment, for example, a solution (nonaqueous electrolytic solution) obtained by dissolving a lithium salt in an organic solvent is used. There is no particular restriction on the lithium salt, and a conventionally and publicly known lithium salt may be used. Although there is no particular restriction on the lithium salt, examples thereof include $LiPF_6$ (lithium hexafluorophosphate), $LiClO_4$, $LiBF_4$, $LiAsF_6$, $Li_2SiF_6$, $LiOSO_2C_kF_{2k+1}$ (wherein k is an integer of 1 to 8), $LiN(SO_2C_kF_{2k+1})_2$ (wherein k is an integer of 1 to 8), $LiPF_n(C_kF_{2k+1})_6$-n (wherein n is an integer of 1 to 5, and k is an integer of 1 to 8), $LiPF_4(C_2O_4)$, and $LiPF_2(C_2O_4)_2$. Among these, $LiPF_6$ is preferable. By using $LiPF_6$, the battery characteristics and safety tend to be superior even at an elevated temperature. These lithium salts may be used singly, or two or more thereof may be used in combination.

There is no particular restriction on a nonaqueous solvent used for the nonaqueous electrolyte, and a conventionally and publicly known solvent may be used. For example, an aprotic polar solvent is preferable as such a nonaqueous solvent, however not limited thereto.

Examples of the aprotic polar solvent include, without particular limitation thereto, cyclic carbonates, such as ethylene carbonate, propylene carbonate, 1,2-butylene carbonate, 2,3-butylene carbonate, 1,2-pentylene carbonate, 2,3-pentylene carbonate, trifluoromethylethylene carbonate, fluoroethylene carbonate, 4,5-difluoroethylene carbonate, etc.; lactones, such as γ-butyrolactone, γ-valerolactone, etc.; cyclic sulfones, such as sulfolane, etc.; cyclic ethers such as tetrahydrofuran, dioxane, etc.; linear carbonates, such as ethyl methyl carbonate, dimethyl carbonate, diethyl carbonate, methyl propyl carbonate, methyl isopropyl carbonate, dipropyl carbonate, methyl butyl carbonate, dibutyl carbonate, ethyl propyl carbonate, methyl trifluoroethyl carbonate, etc.; nitriles, such as acetonitrile, etc.; linear ether, such as dimethyl ether, etc.; linear carboxylic acid esters such as methyl propionate, etc.; and linear ether carbonate compounds, such as dimethoxyethane, etc. These may be used singly, or two or more thereof may be used in combination.

The nonaqueous electrolyte may contain another additive as necessary. Such other additive is not particularly restricted, however, for example, lithium salts other than those listed above, such as unsaturated bond-containing carbonate, halogen atom-containing carbonate, carboxylic acid anhydride, sulfur atom-containing compounds (for example, sulfide, disulfide, sulfonic acid ester, sulfite, sulfate, sulfonic acid anhydride, etc.), a nitrile group-containing compound, etc.

Specific examples of such other additive are as follows:

Lithium salts: for example, lithium monofluorophosphate, lithium difluorophosphate, lithium bis(oxalato) borate, lithium difluoro(oxalato) borate, lithium tetrafluoro(oxalato) phosphate, lithium difluorobis(oxalato) phosphate, etc.;

Unsaturated bond-containing carbonates: for example, vinylene carbonate, vinyl ethylene carbonate, etc.;

Halogen atom-containing carbonates: for example, fluoroethylene carbonate, trifluoromethylethylene carbonate, etc.;

Carboxylic anhydrides: for example, acetic anhydride, benzoic anhydride, succinic anhydride, maleic anhydride, etc.;

Sulfur atom-containing compounds: for example, ethylene sulfite, 1,3-propane sultone, 1,3-propene sultone, 1,4-butane sultone, ethylene sulfate, vinylene sulfate, etc.;

Nitrile group-containing compounds: for example, succinonitrile, etc.

When a nonaqueous electrolyte contains such other additives, the cycle characteristics of a battery tend to be further improved.

Among them, at least one selected from the group consisting of lithium difluorophosphate and lithium monofluorophosphate is preferable from the viewpoint of further improving cycle characteristics of a battery. The content of at least one additive selected from the group consisting of lithium difluorophosphate and lithium monofluorophosphate is preferably 0.001% by weight or more with respect to 100% by weight of the nonaqueous electrolyte, more preferably 0.005% by weight or more, and furthermore preferably 0.02% by weight or more. When this content is 0.001% by weight or more, a cycle life of a lithium ion secondary battery tends to be further improved. Moreover, this content is preferably 3% by weight or less, more preferably 2% by weight or less, and furthermore preferably 1% by weight or less. When this content is 3% by weight or less, ion conductivity of a lithium ion secondary battery tends to be further improved.

The content of other additive in a nonaqueous electrolyte can be confirmed, for example, by NMR measurement, such as 31P-NMR, 19F-NMR, etc.

A concentration of a lithium salt in the nonaqueous electrolyte is preferably 0.5 mol/L to 6.0 mol/L. In the case of a nonaqueous electrolyte having a concentrated electrolyte salt of 3.0 to 6.0 mol/L, the concentration of the lithium salt is preferably in the above range, because the elution of metal ions can be effectively prevented. From the viewpoint of lowering viscosity of the nonaqueous electrolyte, the concentration of the lithium salt in the nonaqueous electrolyte is more preferably 0.9 mol/L to 1.25 mol/L. The concentration of the lithium salt in the nonaqueous electrolyte can be selected as necessary.

In the present embodiment, the nonaqueous electrolyte may be a liquid electrolyte, or a solid electrolyte.

When the inorganic particles for a nonaqueous electrolyte battery are added into the nonaqueous electrolyte, the content of the inorganic particles for a nonaqueous electrolyte battery in the nonaqueous electrolyte is preferably 5 mg or more per 1 mL of the nonaqueous electrolyte from the viewpoint of favorably securing the effect of its use, and more preferably 10 mg or more.

[Paint and Resin Solid for Nonaqueous Electrolyte Battery]

A paint or a resin solid, which is used for a nonaqueous electrolyte battery, and contains the aforementioned basic inorganic particles and other particles and/or the resin fine particles, is also an aspect of the present invention.

In the present embodiment, the paint may be, in addition to the HF adsorbing inorganic material of a substance which affects the life characteristics or safety of a battery, a liquid paint containing additional components such as a resin, a dispersant, water, and an organic solvent, or a powder paint containing a film forming component such as a resin, etc. As the resin contained in the paint, the various resins described above in connection with the constituent elements of a nonaqueous electrolyte battery may be used. The paint may be formed by a heretofore known method such as mixing, stirring, dispersing, etc.

In the present embodiment, the resin solid contains at least one kind of resins in addition to the HF adsorbing inorganic particle of a substance which affects the life characteristics or safety of a battery. As the resin contained in the resin solid, the various resins described above in connection with the constituent elements of a nonaqueous electrolyte battery may be used. The resin solid may be formed by a known method such as kneading, mixing, extruding, and molding.

[Additional Constitution, Shape and Use of Nonaqueous Electrolyte Battery]

In a nonaqueous electrolyte battery according to the present embodiment, a positive electrode and a negative electrode may be used in the form of a laminate stacked through the intermediary of a separator, or in the form of an electrode roll prepared by further winding up the laminate.

The form of the nonaqueous electrolyte battery according to the present embodiment may include a cylindrical form (e.g. square cylinder, round cylinder, etc.) using a steel can, an aluminum can, etc., as an exterior can. Alternatively, the nonaqueous electrolyte battery according the present embodiment may be formed using a laminated film with a deposited metal as the outer package.

In a case where the nonaqueous electrolyte battery according to the present embodiment is a lithium ion secondary battery, it is preferable that the lithium ion secondary battery includes a laminate or a roll thereof in which a positive electrode, a layer containing at least the inorganic particles for a nonaqueous electrolyte battery described above, a separator, and a negative electrode are laminated in this order. When a plurality of constituent elements of the lithium ion secondary battery is arranged in such order, movement of lithium ions in the battery is secured, and adsorption of a substance which affects the life characteristics or safety of the battery becomes pronounced. The layer containing the inorganic particles may be formed using the paint and the resin solid for a nonaqueous electrolyte battery described above or formed as a part of the multilayer structure separator described above.

[Measurements and Evaluation Method]

<Basicity>

The method for measuring basicity of the inorganic particles is as follows. 10% by weight of inorganic particles used in Examples and Comparative Examples described below were added to deionized water, and the mixture was stirred for 5 minutes at a rotational speed of 1,500 rpm with a defoaming kneader (NBK-1 manufactured by NIHON-SEIKI KAISHA LTD.). Next, 40 g of the water dispersion liquid containing the inorganic particles and 100 g of φ3 mm balls were charged into an 80 ml zirconia container, set in a planetary ball mill (FRISCH; P-5), and crushed for 30 minutes at a rotational speed of 100 rpm. The state of the dispersion was measured using a particle size distribution analyzer (HORIBA; LA-920), and it was confirmed that the peak of the primary particle appeared as a particle size distribution. After the preparation, the system was adjusted to a constant temperature of 25° C. in a thermostatic chamber kept at 25° C.

First, a pH was confirmed using a Merck pH stick pH 0-14. After this, a composite electrode for pH measurement was connected to a pH meter and power was turned on. A saturated aqueous potassium chloride solution (3.33 mol/L) was used as a pH electrode internal liquid. Next, each of 100 ml beakers was filled with a pH 4.01 standard solution (phthalate standard solution), pH 6.86 standard solution (neutral phosphate standard solution), and pH 9.18 standard solution (borate standard solution), respectively, and each beaker was immersed in a thermostatic bath at 25° C. for 30 minutes. The pH measurement electrode was immersed in the standard solution adjusted to the constant temperature for 3 minutes, and calibration operation was performed in the order of pH 6.86, pH 9.18, and pH 4.01.

After carrying out the calibration operation, the pH measurement electrode was immersed for 3 minutes in water dispersion liquid containing the inorganic particles, a temperature of which was adjusted to the aforementioned constant temperature, and then pH was measured.

When the pH obtained by the above measurement method was 7.5 or greater, the inorganic particles were regarded as basic inorganic particles. Conversely, when the pH was less than 7.5, the inorganic particles were regarded non-basic inorganic particles.

<X-Ray Diffraction Measurement>

With regard to X-ray diffraction measurement method of the inorganic particles is as follows: powder X-ray diffraction measurement was carried out using an X-ray diffractometer (D2 PHASER, manufactured by Bruker Corporation) using Cu-Kα ray, under the conditions of accelerating voltage of 30 kV, tube current of 10 mA, divergence slit of 1 mm, Soller slit of 4°, air scatter screen of 1 mm, Kβ filter of 0.5 mm, counting time of 0.15 sec, 0.02° step, and measurement range of 5° to 40°. A standard silicon powder was used for correction of the X-ray diffractometer.

<Water Vapor Adsorption BET Specific Surface Area Measurement>

With respect to measurement of a water vapor adsorption BET specific surface area of the inorganic particles, an adsorption isotherm by water vapor was measured by a constant volume method using the following apparatus. Water vapor was supplied to the glass tube containing the pretreated inorganic particles at an adsorption temperature while the relative pressure of the water vapor was increased until it was about 0.3. The amount of adsorption of water vapor to the inorganic particles was measured while being supplied with water vapor to obtain an adsorption isotherm. Then, while reducing the relative pressure of the water vapor in the glass tube until the relative pressure of the water vapor was about 0.1, the amount of adsorption of water vapor on the inorganic particles was measured. Next, the inorganic particles were deaerated at an adsorption temperature for 2 hours in the measuring apparatus.

From the obtained adsorption isotherm, the specific surface area (BET 1) of the inorganic particles was calculated by a BET method (multipoint method, 7 points in the range of relative pressure about 0.1 to 0.3).

(Apparatus)
Measuring device: BELSORP-aqua III (manufactured by Nippon Bell Co., Ltd.)
Pretreatment device: BELPREP-vac II (manufactured by Nippon Bell Co., Ltd.)

<Pretreatment Method>
Inorganic particles placed in a glass tube were subjected to vacuum deaeration at 200° C. for 8 hours.
<Measurement Conditions>
Adsorption temperature: 298.15K
Saturated vapor pressure: 3.169 kPa
Adsorbate cross section: 0.125 nm$^2$
Adsorbent: pure water
Molecular weight of water: 18.020
Equilibrium waiting time: 500 sec*
* A waiting time after reaching the adsorption equilibrium state (a state in which the pressure change at adsorption/desorption becomes less than a prescribed value)

<Nitrogen Adsorption BET Specific Surface Area Measurement>

With respect to measurement of a nitrogen adsorption BET specific surface area of the inorganic particles, an adsorption isotherm by nitrogen was measured by a constant volume method using the following apparatus. Nitrogen was supplied to the glass tube containing the pretreated inorganic particles at an adsorption temperature while the relative pressure of nitrogen was increased until the relative pressure of nitrogen was about 0.5. The amount of adsorption of nitrogen to the inorganic particles was measured while being supplied with water vapor to obtain an adsorption isotherm. The adsorption isotherm was obtained from the amount of adsorption of nitrogen to the inorganic particles in the step of increasing the relative nitrogen pressure, and the relative nitrogen pressure.

From the obtained adsorption isotherm, the specific surface area (BET 2) of the inorganic particles was calculated by a BET method (multipoint method, 5 points in the range of relative pressure about 0.1 to 0.2).

(Apparatus)
Measuring device: BELSORP-mini (manufactured by Nippon Bell Co., Ltd.)
Pretreatment device: BELPREP-vac II (manufactured by Nippon Bell Co., Ltd.)

<Pretreatment Method>
Inorganic particles placed in a glass tube were subjected to vacuum deaeration at 200° C. for 8 hours.
<Measurement Conditions>
Adsorption temperature: 77K
Adsorbent: nitrogen
Saturated vapor pressure: measured value
Adsorbate cross section: 0.162 nm$^2$
Equilibrium waiting time: 500 sec*
*A waiting time after reaching the adsorption equilibrium state (a state in which the pressure change at adsorption/desorption becomes less than a prescribed value)

<Evaluation of HF Adsorption Capacity>

The method for evaluating a HF adsorption capacity of the inorganic particles for a nonaqueous electrolyte battery according to the present embodiment is an evaluation method including the following steps such as, for example, a step of preparing a nonaqueous electrolyte solution having an HF concentration of 10 to 10,000 ppm by adding distilled water to a cyclic and/or a linear carbonate solution containing 0.1 to 6.0 mol/L of LiPF$_6$, a step of preparing a nonaqueous electrolyte mixed solution in which 0.1 to 100 parts by weight of the basic inorganic particles are added to 100 parts by weight of the nonaqueous electrolyte solution at a dew point of −40° C. or lower, a step of stirring the nonaqueous electrolyte mixed solution at 15 to 45° C. for 10 seconds to 96 hours, a step of filtering the nonaqueous electrolyte mixed solution after stirring with a filter having a pore size of 0.1 to 1.0 µm, and a step of quantifying a fluoride ion concentration in the filtrate.

Further, the method for evaluating a HF adsorption capacity of the separator according to the present embodiment is an evaluation method including the following steps such as for example, a step of preparing a nonaqueous electrolytic solution having an HF concentration of 10 to 10,000 ppm by adding distilled water to a cyclic and/or linear carbonate mixed solution containing 0.1 to 6.0 mol/L of $LiPF_6$, a step of immersing the separator into 100 parts by weight of the nonaqueous separator such that the amount of the basic inorganic particles contained in the separator is 0.1 to 100 parts by weight with respect to 100 parts by weight of the nonaqueous electrolyte at a dew point of −40° C., a step of stirring the separator at 0 to 45° C. in the solution for 10 seconds to 96 hours, and a step of quantifying a fluoride ion concentration in the nonaqueous electrolyte after stirring.

Moreover, the method for evaluating a HF adsorption capacity of the separator according to the present embodiment is an evaluation method including the following steps such as for example, a step of preparing a nonaqueous electrolytic solution having an HF concentration of 10 to 10,000 ppm by adding distilled water to a cyclic and/or linear carbonate mixed solution containing 0.1 to 6.0 mol/L of $LiPF_6$, a step of passing 10 μl to 1l of the nonaqueous electrolyte through the separator at a speed of 100 ml/h/m² to 10,000 ml/h/m² so that the amount of the basic inorganic particles contained in the separator is 0.1 to 100 parts by weight with respect to 100 parts of the nonaqueous electrolyte solution at a dew point of −40° C., a step of quantifying a concentration of fluoride ions in the nonaqueous electrolyte passing through the separator by ion chromatography analysis.

As a specific method for adding the basic inorganic particles to the separator, when the separator has a single layer structure, the basic inorganic particles can be added to a microporous membrane or nonwoven fabric as described above, and when the separator has a multilayer structure, the microporous membrane or a non-woven fabric can be used as a base material, and the basic inorganic particles can be added in a porous layer that is placed on one side or both sides of the base material.

When evaluating the separator, the inorganic particles may be added so that the amount of the inorganic particles falls within the above range. The separator may be single or divided.

Since $LiPF_6$ decomposes when exposed to $H_2O$, and generates HF, it is preferable to evaluate it in an atmosphere from which water is removed for the purpose of quantifying a HF adsorption capacity. As a dew point, it is preferably −40° C. or lower, more preferably −45° C. or lower, and still more preferably −50° C. or lower. Although there is no particular restriction on a gas component, particularly, the HF adsorption capacity should be more preferably evaluated under an inert gas atmosphere, still more preferably in nitrogen gas or argon gas, and most particularly in an argon gas atmosphere.

There is no particular restriction on a composition of a mixed solution of $LiPF_6$ and a cyclic and/or a linear carbonate as long as it is the composition described in the aforementioned electrolytic solution.

$H_2O$ is added to a mixed solution of a cyclic and/or a linear carbonate containing $LiPF_6$ to generate HF. For addition of $H_2O$, any $H_2O$ may be used as long as impurities are reduced, however not particularly limited thereto. For example, distilled water, deionized water, etc. can be used. With respect to addition of $H_2O$, it may be previously added in the atmosphere.

As long as the reaction of $H_2O$ with $LiPF_6$ proceeds, the retention time thereof is not particularly limited. However, in order to ensure that the reaction proceeds, it is preferable to stand as it is after addition of $H_2O$, preferably to stand for 1 day, more preferably for 7 days, and still more preferably for 2 weeks.

From the viewpoint of quantitative accuracy, the concentration of HF in the aforementioned nonaqueous electrolyte solution is preferably higher than a certain concentration, preferably 10 ppm or more, more preferably 50 ppm or more, and still more preferably 100 ppm or more. The upper limit thereof is preferably 10,000 ppm or less, preferably 5,000 ppm or less, and more preferably 1,000 ppm or less, in order to reproduce the actual state in a battery.

There is no particular limitation on a container used for reactions as long as it has chemical resistance, particularly acid resistance.

From the viewpoint of quantitative accuracy, the amount of the basic inorganic particles is preferably higher than a certain concentration, and preferably 0.1 parts by weight or more with respect to 100 parts by weight of the nonaqueous electrolyte solution, and more preferably 1 part by weight. In addition, the upper limit thereof is preferably 100 parts by weight or less, more preferably 50 parts by weight or less, and still more preferably 30 parts by weight or less, from the viewpoint of not impairing flowability of the nonaqueous electrolyte solution.

The reaction temperature is preferably 0° C. or higher from the viewpoint of flowability, more preferably 20° C. or higher, and the upper limit is preferably a temperature at which a nonaqueous electrolyte solution does not easily evaporate, and is preferably 45° C. or lower, more preferably 35° C. or lower, and furthermore preferably 30° C. or lower.

In order not to induce concentration gradient of HF in the nonaqueous electrolyte solution, it is preferable to stir the system invariably by means of propeller agitation, shaking agitation, mix rotor, vortex, ultrasonic waves, etc., however, the agitation method is not particularly restricted. When the dispersion is complete, there is no need to stir it. The stirring time is preferably 10 seconds or longer, more preferably 30 seconds or longer, and still more preferably 1 minute or longer, from the viewpoint of sufficient adsorption. The upper limit thereof is preferably 96 hours or shorter, more preferably 48 hours or shorter, and still more preferably 24 hours or shorter, from the viewpoint of evaluation throughput.

When powder remains in the nonaqueous electrolyte solution, it is preferable to use a filter. For example, a membrane filter can be used. The pore size is preferably 0.1 to 1.0 μm from the viewpoint of filtration. In order to reliably filter the particles, the filter size is more preferably 0.5 μm or less, and still more preferably 0.2 μm or less. In addition, the lower limit is preferably 0.1 μm or more from the viewpoint of evaluation throughput. There is no particular restriction on a type of filters that can be used as long as powder filtration can be achieved as described above. For example, a membrane filter made of PP, PTFE, etc. can be used.

The measurement of a fluoride ion concentration in the filtrate is not particularly restricted so long as fluoride ions can be quantified. For example, neutralization titration, ion chromatography analysis, etc. can be used. From the viewpoint of quantitativeness for a microscopic amount, ion chromatography analysis is preferred.

When powder does not fall off from a separator, a filtration step is not essential. On the other hand, it is preferable to apply filtration step in case of fall-off When evaluating a HF adsorption capacity of the separator, a HF concentration in an electrolyte solution can be measured by passing an electrolyte solution through the separator as a membrane material. For example, the HF concentration capacity of the aforementioned inorganic particle can be measured by mounting a separator on a Swinex holder, pumping the electrolyte solution using a syringe, and measuring the HF concentration of the electrolyte solution that passed through the separator.

The amount of an electrolyte solution per unit time passing through a separator per unit area is, from the viewpoint of throughput, preferably 100 ml/h/m$^2$ or more, preferably 500 ml/h/m$^2$ or more, and more preferably 1,000 ml/h/m$^2$ or more. The upper limit thereof is preferably 10,000,000 ml/h/m$^2$ or less, more preferably 5,000,000 ml/h/m$^2$ or less, and still more preferably 1,000,000 ml/h/m$^2$ or less from the viewpoint of adsorbing HF to the separator.

From the viewpoint of quantitativeness of the solution that passed through the separator, it is preferable to measure several times a value for a sample volume of 10 µl or more and the values obtained are averaged. The sample volume is more preferably 100 µl or more and still more preferably 500 µl or more. The upper limit is preferably 11 or less, more preferably 500 ml or less, and still more preferably 250 ml or less from the viewpoint of throughput and a neutralization amount of HF for the basic inorganic particles.

When a separator is evaluated using the aforementioned methods, the separator is preferably obtained as a separator, wherein a HF concentration decreases to less than 90% of an initial HF concentration when 10 ml of a nonaqueous electrolyte solution passed through the separator at a speed of 250,000 ml/h/m$^2$, such that an amount of the basic inorganic particles contained in the separator is [HF concentration (ppm)]/100 parts by weight with respect to 100 parts by weight of the nonaqueous electrolyte solution, wherein the nonaqueous electrolyte solution is a cyclic and/or a linear carbonate solution having a HF concentration of 10 to 10,000 ppm and containing 0.1 to 6.0 mol/L of LiPF$_6$. The HF concentration decreases to more preferably less than 85% and furthermore preferably less than 80%.

<Evaluation of HF Adsorption Capacity>

A HF adsorption capacity according to the present embodiment was evaluated in the following procedures. Distilled water was added to the nonaqueous electrolyte (solution) used for the nonaqueous electrolyte battery in an argon gas atmosphere and stored at 23° C. for 2 weeks to prepare a nonaqueous electrolyte containing 800 ppm of HF. Then 100 parts by weight of the nonaqueous electrolyte, and 8 parts by weight of the inorganic particles used in Examples and Comparative examples were placed in a hermetically closed container made of polypropylene, which was shaken in an atmosphere at 23° C. for 5 minutes. Thereafter, filtration was carried out with a membrane filter made of PTFE having a pore size of 0.2 µm. The fluoride ion concentration in the filtrate was quantified by ion chromatographic analysis and the HF concentration was calculated. When the HF concentration was less than 720 ppm, the HF adsorption capacity was rated as "Good". When it was 720 ppm or more, the HF adsorptive capacity was rated as "Poor".

<Evaluation of Life Characteristics of Nonaqueous Electrolyte Secondary Battery>

(Initial Charge and Discharge)

The obtained nonaqueous electrolyte secondary battery (hereinafter, also simply referred to as "battery") was placed in a thermostatic chamber (thermostatic chamber PLM-73S, manufactured by Futaba Co., Ltd.) set at 25° C., and connected to a charge/discharge apparatus (charge/discharge apparatus ACD-01, manufactured by Aska Electronic Co., Ltd.). Next, the battery was charged with a constant current of 0.05 C, until the voltage reached 4.35 V, then charged with a constant voltage of 4.35 V for 2 hours, and discharged to 3.0 V with a constant current of 0.2 C. In this regard, 1 C is a current value at which the battery is discharged in 1 hour.

(Cycle Test)

The battery after the initial charge was placed in a thermostatic chamber (thermostatic chamber PLM-73S, manufactured by Futaba Science Co., Ltd.) set at 50° C., and connected with a charging/discharging device (charging/discharging apparatus ACD-01, manufactured by Aska Electronic Co., Ltd.). Next, the battery was charged at a constant current of 1 C, until the voltage reached 4.35 V, thereafter charged with a constant voltage of 4.35 V for 1 hour, and discharged to 3.0 V with a constant current of 1 C. This series of charging and discharging was regarded as one cycle, and another 99 cycles of charging and discharging were repeated. In doing so, the retention rate of the discharge capacity and the presence or absence of a micro short circuit were evaluated.

The retention rate of the discharge capacity (unit: %) was calculated from the discharge capacity at the first cycle and the discharge capacity at the 40th cycle according to the following equation:

Retention rate of discharge capacity=(Discharge capacity at 40th cycle/Discharge capacity at 1st cycle)×100.

Regarding the presence or absence of a micro short circuit, a case, in which the charge capacity was at least 2 times as high as the rated capacity at any of the 1st cycle to the 100th cycle, was rated that a micro short circuit "occurred", and a case, in which it was less than 2 times, was rated that a micro short circuit did "not occurred". Furthermore, a case, in which the charge capacity was less than 2 times at any of the cycle greater than the 125th cycle, was rated that a micro short circuit did not occurred (abbreviated as "Not at all").

<Evaluation of Battery Swelling>

With regard to battery swelling, a case, in which the volume of the battery after the cycle test increases by 10% or more with respect to the volume before the initial charge and discharge, was rated that the battery was "Swelling", and a case, in which it is less than 10%, the battery exhibits "No swelling".

EXAMPLES

The present invention will be described below in more detail by way of Examples, provided that the present invention be not limited to the Examples. In addition, various measurements and evaluations were carried out under conditions of room temperature 23° C., 1 atm, and relative humidity 50% unless otherwise specified.

Example 1

<Preparation of Calcium Silicate>

Silicon dioxide and calcium oxide were melted and cooled. In this case, the C/S ratio (CaO/SiO$_2$ mole ratio) was 1.0. The sample was pulverized with a ball mill, and dried to obtain calcium silicate A.

X-ray diffraction measurement of calcium silicate A obtained was carried out and from the diffraction pattern, diffraction peaks were observed in the vicinity of 23.2° (2θ), of 26.9° (2θ), and of 28.9° (2θ), which was identified as the structure of wollastonite. The diffraction pattern obtained is shown in the FIGURE at (A).

Calcium silicate A was defoamed and kneaded at a prescribed concentration, and a ball mill was used to prepare a slurry. The state of dispersion was measured using a particle size distribution analyzer (HORIBA; LA-920), and it was confirmed that the peak of the primary particle size appeared as a particle size distribution. After the preparation, the temperature in the thermostatic chamber was adjusted to a constant temperature of 25° C. First, it was confirmed that pH was 10 using a Merck pH stick pH 0-14. Then, the pH was 10.48 that was measured using a pH meter, confirming that it was a basic particle.

From the adsorption isotherm of calcium silicate A, the specific surface area (BET1) of the inorganic particles was calculated by the BET method (multipoint method, 7 points in the range of about 0.1 to 0.3 relative pressure). The BET 1 was calculated to be 1.75 m$^2$/g.

Further, from the adsorption isotherm by nitrogen, the specific surface area (BET 2) of the inorganic particles was calculated by the BET method (multipoint method, 5 points in the range of relative pressure about 0.1 to 0.2). The BET 2 was calculated to be 1.21 m$^2$/g. Therefore, the value of BET1/BET2 was calculated to be 1.45.

As a result of the evaluation of the HF adsorption capacity described above, the HF adsorption capacity was 80 ppm or more, and the HF adsorption capacity was determined to be "Good".

In order to identify and quantify metal species other than alkali metals or Mg, Be, and alkaline-earth metals contained in a molar ratio of 0.01% or more, ICP emission analysis was applied. Wollastonite A contained 0.05% of Fe and 0.03% of Al, respectively.

<Preparation of Separator>

A polyolefin resin mixture was obtained by dry-blending 47.5 parts by weight of a polyethylene homopolymer with Mv (viscosity-average molecular weight) of 700,000; 47.5 parts by weight of a polyethylene homopolymer with Mv 250,000; and 5 parts by weight of a polypropylene homopolymer with Mv 400,000 using a tumbler blender. Further, 1% by weight of pentaerythrityl-tetrakis[3-(3,5-di-t-butyl-4-hydroxyphenyl)propionate] was added as an antioxidant to 99% by weight of the obtained polyolefin resin mixture and all were dry-blended gain using a tumbler blender to obtain a polyolefin resin composition.

After purging with nitrogen, the obtained polyolefin resin composition was fed to a twin-screw extruder with a feeder in a nitrogen atmosphere. A liquid paraffin (kinematic viscosity at 37.78° C.: 7.59×10$^{-5}$ m$^2$/s) was injected into the extruder cylinder by a plunger pump. The feeder and the pump were adjusted such that the liquid paraffin content in the entire mixture melt-kneaded and extruded by the twin-screw extruder was 66% by weight (the resin composition concentration was 34%). The melt kneading conditions were: set temperature of 200° C., screw rotation speed of 100 rpm, and discharge rate of 12 kg/h.

Subsequently, the melt-kneaded product was extruded through a T-die and cast on a cooling roll regulated at a surface temperature of 25° C. to obtain a gel sheet with a thickness of 1,600 μm. Next, the obtained gel sheet was guided to a simultaneous biaxial tenter stretching machine and stretched biaxially. The set stretching conditions were: MD strething ratio of 7.0, TD stretching ratio of 6.1, and set temperature of 123° C. Next, the gel sheet after biaxial stretching was guided to an ethyl methyl ketone tank, sufficiently immersed in ethyl methyl ketone to extract and remove liquid paraffin, and then ethyl methyl ketone was removed by drying. Finally, the dried gel sheet was guided to a TD tenter and stretched and thermally relaxed to obtain a polyolefin microporous membrane. The stretching temperature was 125° C., the thermal relaxation temperature was 133° C., the TD maximum stretching ratio was 1.65, and the relaxation rate was 0.9. The obtained polyolefin microporous membrane had a thickness of 12 μm and a porosity of 40%.

29 parts by weight of the calcium silicate A and 0.29 parts by weight of a polycarboxylate ammonium aqueous solution (SN Dispersant 5468, manufactured by San Nopco Co., Ltd.) were mixed in 100 parts by weight of ion exchanged water. After mixing, a bead mill treatment was carried out to adjust the average particle diameter (D50) to 1.5 μm to obtain a dispersion. Further, to 100 parts by weight of the obtained dispersion, 2.2 parts by weight of an acrylic latex suspension (solid content concentration of 40%, and average particle diameter of 150 nm) was added as a binder, and the two were mixed to prepare a uniform composition for a porous layer. In this regard, the average particle diameter of the layered calcium silicate A in the above dispersion was determined by measuring the particle size distribution using a laser particle size distribution analyzer (Microtrac MT 3300 EX, manufactured by Nikkiso Co., Ltd.), and calculating a particle diameter at which the volume cumulative frequency is 50% as the average secondary particle diameter (μm). The average particle size of the resin latex binder was determined by measuring a volume average particle diameter (nm) as the average particle diameter using a particle diameter measuring device (MICROTRACTMUPA 150 manufactured by Leed & Northrup Co.) based on a light scattering method.

Next, the composition for forming a porous layer was coated on the surface of the polyolefin microporous membrane using a micro gravure coater, dried at 60° C. to remove ion-exchanged water, and a 3 μm-thick porous layer containing calcium silicate A was placed on the polyolefin microporous membrane to obtain a multilayer structure separator that has a porous layer containing the calcium silicate A. In the separator, the volume ratio of the calcium silicate A in the porous layer containing the calcium silicate A was 97% by volume.

<Production of Positive Electrode>

$LiNi_{0.5}Co_{0.2}Mn_{0.3}O_2$ as the positive electrode active material, an acetylene black powder as the conductive auxiliary agent, and a polyvinylidene fluoride solution as the binder were mixed at a solid content ratio of 93.9/3.3/2.8 by weight ratio. To the obtained mixture, N-methyl-2-pyrrolidone was added as a dispersion solvent to a solid content of 35% by weight, and the mixture was further mixed to prepare a slurry-like solution. The slurry-like solution was coated on both sides of a 10 μm thick aluminum foil. In doing so, a part of the aluminum foil was exposed. Thereafter, the solvent was removed by drying and rolling was carried out with a roll press. The sample after rolling was trimmed such that the size of the coated part was 30 mm×50 mm, and the exposed part of the aluminum foil was included, and an aluminum lead piece for taking out current was welded to the exposed part of the aluminum foil thereby obtaining a positive electrode.

<Preparation of Negative Electrode>

A graphite powder as the negative electrode active material, and a styrene butadiene rubber and a carboxymethyl-cellulose aqueous solution as the binder were mixed at a weight ratio of solid contents of 97.5/1.5/1.0. The obtained mixture was added to water as a dispersion solvent such that the solid content concentration was 45% by weight to prepare a slurry-like solution. The slurry-like solution was coated on one side or both sides of a 10 μm-thick copper foil. In doing so, a part of the aluminum foil was exposed. Thereafter, the solvent was removed by drying and rolled with a roll press. The sample after rolling was trimmed such that the size of the coated part was 32 mm×52 mm, and the exposed part of the copper foil was included, and a nickel lead piece for taking out current was welded to the exposed part of the copper foil thereby obtaining a negative electrode.

<Preparation of Nonaqueous Electrolyte>

$LiPF_6$ was dissolved at 1 mol/L in a mixed solvent in which ethylene carbonate (EC) and ethyl methyl carbonate (EMC) were mixed at a volume ratio of 1/2 in an argon gas atmosphere, to obtain a nonaqueous electrolyte (nonaqueous electrolytic solution).

<Preparation of Nonaqueous Electrolyte Battery>

The positive electrode and the negative electrode were combined through the intermediary of the separator to form a laminated electrode body. The separator was disposed such that a porous layer containing calcium silicate A faced the positive electrode. The laminated electrode body was inserted into an aluminum laminate outer package of 80×60 cm. Next, the nonaqueous electrolyte (nonaqueous electrolytic solution) was injected into the outer package, and then the opening of the outer package was closed to complete a nonaqueous electrolyte battery (lithium ion secondary battery) (hereinafter simply referred to as "battery") having internally a laminated electrode body. The rated capacity of the obtained nonaqueous electrolyte battery was 90 mAh. As a result of the evaluation of the life characteristics described above, the retention rate of discharge capacity was 94%, a micro short circuit was "Not at all", and the battery swelling was "No swelling".

Example 2

Silicon dioxide and calcium oxide were dispersed in water to form a slurry, and then maturation was carried out in an autoclave at 220° C. in saturated steam for 40 hours. After the maturation, it was calcinated at 900° C. In this case, the C/S ratio was 0.98. The sample was pulverized with a ball mill, and dried to obtain calcium silicate B. The BET1 of the obtained calcium silicate B was 19.3 m²/g and BET2 was 29.9 m²/g. Therefore, the BET1/BET2 was calculated to be 0.57. Further, an X-ray diffraction measurement was carried out in the same manner as in Example 1. From the diffraction pattern, diffraction peaks were observed in the vicinity of 23.2° (2θ), of 26.9° (2θ), and of 28.9° (2θ), which was identified as the structure of wollastonite. The obtained diffraction pattern is shown in (B) the FIGURE at (B).

Using calcium silicate B, a multilayer structure separator that has a porous layer containing the calcium silicate B was obtained in the same manner as in Example 1. In the separator, the volume ratio of the calcium silicate B in the porous layer containing the calcium silicate B was 97% by volume. Further, measurement of basicity, evaluation of HF adsorption capacity, identification and quantification of metals contained, and evaluation of life characteristics and battery swelling were carried out in the same manner as in Example 1.

Example 3

Silicon dioxide, and calcium oxide were dispersed in water to form a slurry, and then maturation was carried out in an autoclave at 180° C. in saturated steam for 40 hours. After the maturation, it was calcinated at 900° C. In this case, the C/S ratio was 0.83. The sample was pulverized with a ball mill, and dried to obtain calcium silicate C. The BET1 of the obtained calcium silicate C was 23.3 m²/g and BET2 was 22.8 m²/g. Therefore, the BET1/BET2 was calculated to be 1.02. From the diffraction pattern, diffraction peaks were observed in the vicinity of 11.5° (2θ) and of 30.1° (2θ), which was identified as the structure of wollastonite. The obtained diffraction pattern is presented in the FIGURE at (C).

Using the calcium silicate C, a multilayer structure separator that has a porous layer containing the calcium silicate C was obtained in the same manner as in Example 1. In the separator, the volume ratio of the calcium silicate C in the porous layer containing the calcium silicate C was 97% by volume. Further, measurement of basicity, evaluation of HF adsorption capacity, identification and quantification of metals contained, and evaluation of life characteristics and battery swelling were carried out in the same manner as in Example 1.

Example 4

Wollastonite (KAP—150 manufactured by Kansaimatec Co., Ltd.) was pulverized with a ball mill, and dried to obtain calcium silicate D. The BET1 of the obtained calcium silicate D was 1.9 m²/g and BET2 was 1.1 m²/g. Therefore, the BET1/BET2 was calculated to be 1.70.

Using the calcium silicate D, a multilayer structure separator that has a porous layer containing the calcium silicate C was obtained in the same manner as in Example 1. In the separator, the volume ratio of the calcium silicate D in the porous layer containing the calcium silicate D was 97% by volume. Further, measurement of basicity, evaluation of HF adsorption capacity, identification and quantification of metals contained, and evaluation of life characteristics and battery swelling were carried out in the same manner as in Example 1.

Example 5

With the exception of mixing calcium silicate A and boehmite as other inorganic particles at a weight ratio of the former to the latter, 1/9, a multilayer structure separator that has a porous layer containing the calcium silicate A and boehmite was obtained in the same manner as in Example 1. As for boehmite, basicity was measured as in the manner described above and confirmed to be non-basic. In the separator the volume ratio of the inorganic particles in the inorganic particle-containing layer of the separator was 97% by volume. Further water vapor adsorption BET specific surface area measurement, nitrogen adsorption BET specific surface area measurement, evaluation of HF adsorption capacity, identification and quantification of metals contained, and evaluation of life characteristics and battery swelling were carried out in the same manner as in Example 1. For the water vapor adsorption BET specific surface area measurement, the nitrogen adsorption BET specific surface area measurement, the evaluation of HF adsorption capacity and the identification and quantification of metals contained, a powder mixture of the calcium silicate A and boehmite was used for these measurements. For the water vapor adsorption BET specific surface area measurement, the nitrogen adsorption BET specific surface area measurement, and the evaluation of HF adsorption capacity, the particles were evaluated in the state of a mixture in the same manner as in the Example 1. The identification and quantification of metals contained in the basic inorganic particles was carried out using SEM/EDX.

Example 6

Using a mixture obtained by mixing calcium silicate A and alumina as other inorganic particles at a weight ratio of 5/5, a multilayer structure separator that has a porous layer containing the calcium silicate A and alumina and a battery were obtained in the same manner as in Example 1. For alumina, basicity measurement was carried out as in the manner described above and confirmed to be non-basic. In the separator the volume ratio of the inorganic particles in the inorganic particle-containing layer was 97% by volume. Further water vapor adsorption BET specific surface area measurement, nitrogen adsorption BET specific surface area measurement, evaluation of HF adsorption capacity, identification and quantification of metals contained, and evaluation of life characteristics and battery swelling were carried out in the same manner as in Example 1. For the water vapor adsorption BET specific surface area measurement and the nitrogen adsorption BET specific surface area measurement, a powder mixture of the calcium silicate A and alumina was used for these measurements. For the water vapor adsorption BET specific surface area measurement, the nitrogen adsorption BET specific surface area measurement, and the evaluation of HF adsorption capacity, the particles were evaluated in the state of a mixture in the same manner as in the Example 1. The identification and quantification of metals contained in the basic inorganic particles was carried out using SEM/EDX.

Example 7

Silicon dioxide, and calcium oxide were dispersed in water to form a slurry, and then maturation was carried out in an autoclave at 180° C. in saturated steam for 40 hours. After the maturation, it was calcinated at 700° C. In this case, the C/S ratio was 0.83. The sample was pulverized with a ball mill, and dried to obtain xonotlite (calcium silicate E). The BET1 of the obtained calcium silicate E was 75.2 m$^2$/g and BET2 was 40.1 m$^2$/g. Therefore, the BET1/BET2 was calculated to be 1.87.

Using the calcium silicate E, a multilayer structure separator that has a porous layer containing the calcium silicate E was obtained in the same manner as in Example 1. In the separator, the volume ratio of the calcium silicate E in the porous layer containing the calcium silicate E was 97% by volume. Further, measurement of basicity, water vapor adsorption BET specific surface area measurement, nitrogen adsorption BET specific surface area measurement, evaluation of HF adsorption capacity, identification and quantification of metals contained, and evaluation of life characteristics and battery swelling were carried out in the same manner as in Example 1.

Example 8

Silicon dioxide, and calcium oxide were dispersed in water to form a slurry, and then maturation was carried out in an autoclave at 180° C. in saturated steam for 40 hours. After the maturation, it was calcinated at 850° C. In this case, the C/S ratio was 0.95. The sample was pulverized with a ball mill, and dried to obtain wollastonite (calcium silicate F). The BET1 of the obtained calcium silicate F was 15.2 m$^2$/g and BET2 was 19.0 m$^2$/g. Therefore, the BET1/BET2 was calculated to be 0.80.

Using the calcium silicate F, a multilayer structure separator that has a porous layer containing the calcium silicate F was obtained in the same manner as in Example 1. In the separator, the volume ratio of the calcium silicate F in the porous layer containing the calcium silicate F was 97% by volume. Further, measurement of basicity, evaluation of HF adsorption capacity, identification and quantification of metals contained, and evaluations of life characteristic and battery swelling were carried out in the same manner as in Example 1.

Example 9

Purified silicon dioxide and purified calcium oxide were dispersed in water to form a slurry, and then maturation was carried out in an autoclave at 180° C. in saturated steam for 40 hours. After the maturation, it was calcinated at 850° C. In this case, the C/S ratio was 0.95. The sample was pulverized with a ball mill, and dried to obtain wollastonite (calcium silicate G). The BET1 of the obtained calcium silicate F was 3.2 m$^2$/g and BET2 was 2.4 m$^2$/g. Therefore, the BET1/BET2 was calculated to be 1.33.

Using the calcium silicate G, a multilayer structure separator that has a porous layer containing the calcium silicate G was obtained in the same manner as in Example 1. In the separator, the volume ratio of the calcium silicate Gin the porous layer containing the calcium silicate G was 97% by volume. Further, measurement of basicity, evaluation of HF adsorption capacity, identification and quantification of metals contained, and evaluation of life characteristics and battery swelling were carried out in the same manner as in Example 1.

Example 10

Zirconium oxychloride octahydrate containing 2% of hafnium was dissolved in water, and then oxalic acid dihydrate was dissolved. In doing so, the molar ratio of zirconium oxychloride octahydrate containing 2% of hafnium to oxalic acid dihydrate was 1/2.9, and the weight ratio of water to these was 4.5 when the total amount thereof was 1. The solution was stirred to which phosphoric acid was added, and then it was refluxed with stirring for 8 hours. In doing so, phosphoric acid was added such that the molar ratio of zirconium oxychloride octahydrate containing 2% of hafnium to phosphoric acid was 1/2.1. After cooling, the obtained precipitate was washed with water, then immersed in a 0.1 N LiOH aqueous solution for 8 hours, and then calcinated at 700° C. for 12 hours to obtain basic zirconium phosphate. The BET1 of the obtained basic zirconium phosphate was 7.7 m$^2$/g and BET2 was 4.9 m$^2$/g. Therefore, the BET1/BET2 was calculated to be 1.93.

Example 11

Silicon dioxide, calcium oxide, γ-alumina, and sodium hydroxide were dispersed in water at a weight ratio of 39.5/43.3/6.5/10.7 to form a slurry, and then maturation was carried out in an autoclave at 190° C. in saturated steam for 20 hours. After the maturation, it was calcinated at 850° C. In this case, the C/S ratio was 0.99. The sample was pulverized with a ball mill, and dried to obtain wollastonite (calcium silicate H). The BET1 of the obtained calcium silicate H was 30.8 m²/g and BET2 was 26.8 m²/g. Therefore, the BET1/BET2 was calculated to be 1.15.

Using the calcium silicate H, a multilayer structure separator that has a porous layer containing the calcium silicate H was obtained in the same manner as in Example 1. In the separator, the volume ratio of the calcium silicate H in the porous layer containing the calcium silicate H was 97% by volume. Further, measurement of basicity, evaluation of HF adsorption capacity, identification and quantification of metals contained, and evaluation of life characteristics and battery swelling were carried out in the same manner as in Example 1.

Example 12

Wollastonite (M-9000 manufactured by NYCO) was pulverized with a ball mill, and dried to obtain calcium silicate I). The BET1 of the obtained calcium silicate I was 2.8 m²/g and BET2 was 2.4 m²/g. Therefore, the BET1/BET2 was calculated to be 1.18.

Using the calcium silicate I, a multilayer structure separator that has a porous layer containing the calcium silicate I was obtained in the same manner as in Example 1. In the separator, the volume ratio of the calcium silicate I in the porous layer containing the calcium silicate I was 97% by volume. Further, measurement of basicity, evaluation of HF adsorption capacity, identification and quantification of metals contained, and evaluation of life characteristics and battery swelling were carried out in the same manner as in Example 1.

Example 13

The beef bone was crushed to a suitable size, cut to a size facilitating calcination, introduced into a compression pot (pressure cooker), and boiled at 300° C. for about 90 minutes. Next, the boiled beef bone was fed to a calcination furnace, calcinated at 1100° C. for 80 minutes, and then naturally cooled for 60 minutes in the furnace to return to room temperature. The calcinated beef bone was cut into pieces with a particle size of 1 to 5 mm and subjected to a powder machine operation to prepare basic apatite as a powder of about 1 μm in size. The BET1 of the obtained basic apatite was 10.3 m²/g, and BET2 was 6.2 m²/g. Therefore, the value of BET1/BET2 was calculated to be 1.67.

Using the basic apatite, a multilayer structure separator that has a porous layer containing the basic apatite was obtained in the same manner as in Example 1. In the separator, the volume ratio of the basic apatite in the porous layer containing the basic apatite was 97 volume % by volume. Further, measurement of basicity, evaluation of HF adsorption capacity, identification and quantification of metals contained, and evaluation of life characteristics and battery swelling were carried out in the same manner as in Example 1.

Example 14

Sodium silicotitanate (IE-911 manufactured by UOP) was pulverized with a ball mill, and dried to obtain sodium silicotitanate. The BET1 of the obtained sodium silicotitanate was 5.2 m²/g and BET2 was 5.3 m²/g. Therefore, the BET1/BET2 was calculated to be 1.02.

Using the sodium silicotitanate, a multilayer structure separator that has a porous layer containing the sodium silicotitanate was obtained in the same manner as in Example 1. In the separator, the volume ratio of the sodium silicotitanate in the porous layer containing the sodium silicotitanate was 97% by volume. Further, measurement of basicity, evaluation of HF adsorption capacity, identification and quantification of metals contained, and evaluation of life characteristics and battery swelling were carried out in the same manner as in Example 1.

Example 15

ME-100 manufactured by Katakura & Co-op Agri Corporation was dried to obtain basic mica. The BET1 of the obtained the basic mica was 25.2 m²/g and BET2 was 12.9 m²/g. Therefore, the BET1/BET2 was calculated to be 1.95.

Using the basic mica, a multilayer structure separator that has a porous layer containing the basic mica was obtained in the same manner as in Example 1. In the separator, the volume ratio of the basic mica in the porous layer containing the basic mica was 97 volume % by volume. Further, measurement of basicity, evaluation of HF adsorption capacity, identification and quantification of metals contained, and evaluation of life characteristics and battery swelling were carried out in the same manner as in Example 1.

Examples 16 to 22

Using a mixture obtained by mixing the particles described in Examples 9 to 15 and the other inorganic particles being alumina and boehmite, respectively, at a weight ratio of 5/5, a multilayer structure separator that has a porous layer containing the basic inorganic particles and the other inorganic particles, and batteries, were obtained in the same manner as in Example 1. In the separator, the volume ratio of the inorganic particles in the inorganic particle-containing layer was 97% by volume. Further a water vapor adsorption BET specific surface area measurement, a nitrogen adsorption BET specific surface area measurement, an evaluation of HF adsorption capacity, an identification and quantification of metals contained, and evaluation of life characteristics and battery swelling were carried out in the same manner as in Example 1. For the water vapor adsorption BET specific surface area measurement and for the nitrogen adsorption BET specific surface area measurement, powder mixtures of each basic inorganic particle and each other particle were used. The evaluation of HF adsorption capacity was carried out in the state of a mixture of the particles in the same manner as in Example 1 and the identification and quantification of metals contained in the basic inorganic particles was carried out using SEM/EDX.

Examples 23 to 25

The nonaqueous electrolyte batteries of Examples 23, 24 and 25 are manufactured in the same manner as in Example 1 except that the porous layer of the separator used in Examples 5, 18 and 20 is directed to the negative electrode side, and evaluation of life characteristics and battery swelling were performed.

Comparative Example 1

A multilayer structure separator that has a porous layer containing zeolite was obtained in the same manner as in Example 1 except that zeolite (specific surface area: 550 m²/g) was used in place of calcium silicate A. In the separator, the volume ratio of zeolite in the porous layer containing zeolite was 97% by volume. Further measurement of basicity, water vapor adsorption BET specific surface area measurement, nitrogen adsorption BET specific surface area measurement, evaluation of HF adsorption capacity, identification and quantification of metals contained, and evaluation of life characteristics and battery swelling were carried out in the same manner as in Example 1.

Comparative Example 2

A multilayer structure separator that has a porous layer containing aluminum silicate ($Al_2O_3 \cdot 2SiO_2$) was obtained in the same manner as in Example 1 except that aluminum silicate was used in place of calcium silicate A. In the separator, the volume ratio of aluminum silicate in the porous layer containing aluminum silicate was 97% by volume. Further measurement of basicity, water vapor adsorption BET specific surface area measurement, nitrogen adsorption BET specific surface area measurement, evaluation of HF adsorption capacity, identification and quantification of metals contained, and evaluation of life characteristics and battery swelling were carried out in the same manner as in Example 1.

Comparative Example 3

A multilayer structure separator that has a porous layer containing boehmite (AlO(OH)) and a battery were obtained in the same manner as in Example 1 except that boehmite was used in place of calcium silicate A. In the separator, the volume ratio of boehmite in the porous layer containing boehmite was 97% by volume. Further measurement of basicity, water vapor adsorption BET specific surface area measurement, nitrogen adsorption BET specific surface area measurement, evaluation of HF adsorption capacity, identification and quantification of metals contained, and evaluations of life characteristics and battery swelling were carried out in the same manner as in Example 1.

Comparative Example 4

A multilayer structure separator that has a porous layer containing tobermorite and a battery were obtained in the same manner as in Example 1 except that tobermorite was used in place of calcium silicate A. In the separator, the volume ratio of tobermorite in the porous layer containing tobermorite was 97% by volume. Further measurement of basicity, water vapor adsorption BET specific surface area measurement, nitrogen adsorption BET specific surface area measurement, evaluation of HF adsorption capacity, identification and quantification of metals contained, and evaluations of life characteristics and battery swelling were carried out in the same manner as in Example 1.

Comparative Example 5

A multilayer structure separator that has a porous layer containing tobermorite and a battery were obtained in the same manner as in Example 1 except that tobermorite calcinated at 500° C. was used in place of calcium silicate A. In the separator, the volume ratio of tobermorite in the porous layer containing tobermorite was 97% by volume. Further measurement of basicity, water vapor adsorption BET specific surface area measurement, nitrogen adsorption BET specific surface area measurement, evaluation of HF adsorption capacity, identification and quantification of metals contained, evaluations of life characteristics and battery swelling were carried out in the same manner as in Example 1.

Comparative Example 6

A multilayer structure separator that has a porous layer containing MgO and a battery were obtained in the same manner as in Example 1 except that MgO calcinated at 500° C. was used in place of calcium silicate A. In the separator, the volume ratio of MgO in the porous layer containing MgO was 97% by volume. Further measurement of basicity, water vapor adsorption BET specific surface area measurement, nitrogen adsorption BET specific surface area measurement, evaluation of HF adsorption capacity, identification and quantification of metals contained, and evaluations of life characteristics and battery swelling were carried out in the same manner as in Example 1.

Comparative Example 7

A multilayer structure separator that has a porous layer containing lithium phosphate was obtained in the same manner as in Example 1 except that lithium phosphate (specific surface area 15 $m^2/g$) was used in place of calcium silicate A. In the separator, the volume ratio of lithium phosphate in the porous layer containing lithium phosphate was 97% by volume. Further measurement of basicity, water vapor adsorption BET specific surface area measurement, nitrogen adsorption BET specific surface area measurement, evaluation of HF adsorption capacity, identification and quantification of metals contained, and evaluations of life characteristics and battery swelling were carried out in the same manner as in Example 1.

Comparative Example 8

A multilayer structure separator that has a porous layer containing hydrotalcite was obtained in the same manner as in Example 1 except that hydrotalcite was used in place of calcium silicate A. In the separator, the volume ratio of hydrotalcite in the porous layer containing hydrotalcite was 97% by volume. Further measurement of basicity, water vapor adsorption BET specific surface area measurement, nitrogen adsorption BET specific surface area measurement, evaluation of HF adsorption capacity, identification and quantification of metals contained, and evaluations of life characteristics and battery swelling were carried out in the same manner as in Example 1.

The measurement and evaluation results of Examples 1 to 25 and Comparative Examples 1 to 8 are presented in the following Table 1.

TABLE 1

| | Inorganic particles | | | | | | | |
|---|---|---|---|---|---|---|---|---|
| | HF removing inorganic particle | | | Alkaline metal, Be, Mg, or alkaline-earth metal contained | | | | |
| Exam. 1 | Calcium silicate A | Ca | 20 mol % | — | | — | | — |
| Exam. 2 | Calcium silicate B | Ca | 19 mol % | — | | — | | — |
| Exam. 3 | Calcium silicate C | Ca | 17 mol % | — | | — | | — |
| Exam. 4 | Calcium silicate D | Ca | 19 mol % | — | | — | | — |
| Exam. 5 | Calcium silicate A | Ca | 20 mol % | — | | — | | — |
| Exam. 6 | Calcium silicate A | Ca | 20 mol % | — | | — | | — |
| Exam. 7 | Calcium silicate E | Ca | 17 mol % | — | | — | | — |
| Exam. 8 | Calcium silicate F | Ca | 20 mol % | — | | — | | — |
| Exam. 9 | Calcium silicate G | Ca | 19 mol % | — | | — | | — |
| Exam. 10 | Basic zirconium phosphate | Li | 2.0 mol % | — | | — | | — |
| Exam. 11 | Calcium silicate H | Ca | 16 mol % | Na | 3.1 mol % | Mg | 0.75 mol % | — |
| Exam. 12 | Calcium silicate I | Ca | 20 mol % | K | 0.23 mol % | Mg | 0.05 mol % | — |
| Exam. 13 | Basic apatite | Ca | 38 mol % | Sr | 0.05 mol % | K | 0.05 mol % | — |
| Exam. 14 | Sodium silicotitanate | Na | 2.8 mol % | — | | — | | — |
| Exam. 15 | Basic mica | Na | 8.2 mol % | Mg | 17 mol % | — | | — |
| Exam. 16 | Calcium silicate G | Ca | 19 mol % | — | | — | | — |
| Exam. 17 | Basic zirconium phosphate | Li | 2.0 mol % | — | | — | | — |
| Exam. 18 | Calcium silicate H | Ca | 16 mol % | Na | 3.1 mol % | — | 0.75 mol % | |
| Exam. 19 | Calcium silicate I | Ca | 20 mol % | K | 0.23 mol % | Mg | 0.05 mol % | |
| Exam. 20 | Basic apatite | Ca | 38 mol % | Sr | 0.05 mol % | K | | — |
| Exam. 21 | Potassium silicotitanate | Na | 2.8 mol % | — | | — | | — |
| Exam. 22 | Basic mica | Na | 8.2 mol % | Mg | 17 mol % | — | | — |
| Exam. 23 | Calcium silicate A | Ca | 20 mol % | — | | — | | — |
| Exam. 24 | Calcium silicate H | Ca | 16 mol % | Na | 3.1 mol % | — | | — |
| Exam. 25 | Basic apatite | Ca | 38 mol % | Sr | 0.05 mol % | K | 0.05 mol % | — |
| Comp. exam. 1 | Zeolite | Na | 0.01 mol % | — | | — | | — |
| Comp. exam. 2 | Aluminum silicate | Na | 0.01 mol % | — | | — | | — |
| Comp. exam. 3 | Boehmite | Na | 0.01 mol % | — | | — | | — |
| Comp. exam. 4 | Tobermorite | Ca | 12 mol % | — | | — | | — |
| Comp. exam. 5 | Tobermorite | Ca | 12 mol % | — | | — | | — |
| Comp. exam. 6 | MgO | Mg | 50 mol % | — | | — | | — |
| Comp. exam. 7 | $Li_3PO_4$ | Li | 37 mol % | — | | — | | — |
| Comp. exam. 8 | Hydrotalcite | Mg | 10 mol % | — | | — | | — |

| | Inorganic particles | | | | | | | | Other inorganic particle |
|---|---|---|---|---|---|---|---|---|---|
| | Transition metal or typical metal contained | | | | | | | | |
| Exam. 1 | Fe | 0.05 mol % | Al | 0.03 mol % | — | | — | | — |
| Exam. 2 | Fe | 0.02 mol % | AL | 0.01 mol % | — | | — | | — |
| Exam. 3 | Fe | 0.30 mol % | Al | 0.05 mol % | — | | — | | — |
| Exam. 4 | Fe | 0.13 mol % | Al | 0.47 mol % | — | | — | | — |
| Exam. 5 | Fe | 0.10 mol % | Al | 0.10 mol % | — | | — | | boehmite |
| Exam. 6 | Fe | 0.10 mol % | Al | 0.10 mol % | — | | — | | alumina |
| Exam. 7 | Fe | 0.30 mol % | Al | 0.05 mol % | — | | — | | — |
| Exam. 8 | Fe | 0.02 mol % | Al | 0.01 mol % | — | | — | | — |
| Exam. 9 | — | | — | | — | | — | | — |
| Exam. 10 | Zr | 34.1 mol % | Hf | 0.01 mol % | — | | — | | — |
| Exam. 11 | Fe | 0.02 mol % | Al | 5.2 mol % | — | | — | | — |
| Exam. 12 | Fe | 0.28 mol % | Al | 0.30 mol % | Mn | 0.04 mol % | Ti | 0.05 mol % | — |
| Exam. 13 | Fe | 0.02 mol % | Al | 0.02 mol % | Zn | 0.03 mol % | — | | — |
| Exam. 14 | Ti | 12 mol % | Nb | 13 mol % | Zr | 10 mol % | — | | — |
| Exam. 15 | Fe | 0.05 mol % | Al | 0.02 mol % | — | | — | | — |
| Exam. 16 | — | | — | | — | | — | | boehmite |
| Exam. 17 | Zr | 34.1 mol % | Hf | 0.01 mol % | — | | — | | alumina |
| Exam. 18 | Fe | 0.02 mol % | Al | 5.2 mol % | — | | — | | boehmite |
| Exam. 19 | Fe | 0.28 mol % | Al | 0.30 mol % | Mn | 0.04 mol % | Ti | 0.05 mol % | alumina |
| Exam. 20 | Fe | 0.02 mol % | Al | 0.02 mol % | Zn | 0.03 mol % | — | | boehmite |
| Exam. 21 | Ti | 12 mol % | Nb | 13 mol % | Zr | 10 mol % | — | | alumina |
| Exam. 22 | Fe | 0.05 mol % | Al | 0.02 mol % | — | | — | | boehmite |
| Exam. 23 | Fe | 0.10 mol % | Al | 0.10 mol % | — | | — | | boehmite |
| Exam. 24 | Fe | 0.02 mol % | Al | 5.2 mol % | — | | — | | boehmite |
| Exam. 25 | Fe | 0.02 mol % | AL | 0.02 mol % | Zn | 0.03 mol % | — | | Boehmite |
| Comp. exam. 1 | Al | 9.2 mol % | — | | — | | — | | — |
| Comp. exam. 2 | Al | 24.2 mol % | — | | — | | — | | — |
| Comp. exam. 3 | Al | 26.2 mol % | — | | — | | — | | — |
| Comp. exam. 4 | Fe | 0.02 mol % | — | | — | | — | | — |

TABLE 1-continued

| | | | | | | | | | |
|---|---|---|---|---|---|---|---|---|---|
| Comp. exam. 5 | Fe | 0.02 mol % | — | — | — | — | — | — | — |
| Comp. exam. 6 | — | — | — | — | — | — | — | — | — |
| Comp. exam. 7 | — | — | — | — | — | — | — | — | — |
| Comp. exam. 8 | Al | 0.035 mol % | — | — | — | — | — | — | — |

TABLE 2

| | Inorganic particle | | | | Nonaqueous electrolyte battery Cycle test | | |
|---|---|---|---|---|---|---|---|
| | Basic/ non-basic | BET1/ BET2 | HF adsorption capacity ("good" or "poor") | Separator Thickness (μm) | Retention rate of discharge capacity (%) | Micro short circuit ("occurred", "not occurred" or "not at all") | Battery swelling ("swelling" or "no swelling") |
| Exam. 1 | Basic | 1.45 | Good | 15 | 94 | Not at all | No swelling |
| Exam. 2 | Basic | 0.57 | Good | 15 | 94 | Not at all | No swelling |
| Exam. 3 | Basic | 1.02 | Good | 15 | 94 | Not at all | No swelling |
| Exam. 4 | Basic | 1.70 | Good | 15 | 95 | Not at all | No swelling |
| Exam. 5 | Basic | 1.25 | Good | 15 | 98 | Not at all | No swelling |
| Exam. 6 | Basic | 1.15 | Good | 15 | 98 | Not at all | No swelling |
| Exam. 7 | Basic | 1.87 | Good | 15 | 94 | Not at all | No swelling |
| Exam. 8 | Basic | 0.80 | Good | 15 | 93 | Not at all | No swelling |
| Exam. 9 | Basic | 1.33 | Good | 15 | 91 | Not at all | No swelling |
| Exam. 10 | Basic | 1.93 | Good | 15 | 90 | Not at all | No swelling |
| Exam. 11 | Basic | 1.15 | Good | 15 | 93 | Not at all | No swelling |
| Exam. 12 | Basic | 1.18 | Good | 15 | 93 | Not at all | No swelling |
| Exam. 13 | Basic | 1.67 | Good | 15 | 94 | Not at all | No swelling |
| Exam. 14 | Basic | 1.02 | Good | 15 | 93 | Not at all | No swelling |
| Exam. 15 | Basic | 1.95 | Good | 15 | 95 | Not at all | No swelling |
| Exam. 16 | Basic | 1.22 | Good | 15 | 92 | Not at all | No swelling |
| Exam. 17 | Basic | 1.65 | Good | 15 | 92 | Not at all | No swelling |
| Exam. 18 | Basic | 1.23 | Good | 15 | 97 | Not at all | No swelling |
| Exam. 19 | Basic | 1.26 | Good | 15 | 93 | Not at all | No swelling |
| Exam. 20 | Basic | 1.56 | Good | 15 | 96 | Not at all | No swelling |
| Exam. 21 | Basic | 1.05 | Good | 15 | 98 | Not at all | No swelling |
| Exam. 22 | Basic | 1.78 | Good | 15 | 98 | Not at all | No swelling |
| Exam. 23 | Basic | 1.25 | Good | 15 | 96 | Not at all | No swelling |
| Exam. 24 | Basic | 1.23 | Good | 15 | 95 | Not at all | No swelling |
| Exam. 25 | Basic | 1.56 | Good | 15 | 93 | Not at all | No swelling |
| Comp. exam. 1 | Non-basic | 6.00 | Poor | 15 | 62 | Occurred | Swelling |
| Comp. exam. 2 | Non-basic | 0.24 | Poor | 15 | 66 | Occurred | No swelling |
| Comp. exam. 3 | Non-basic | 1.20 | Poor | 15 | 57 | Occurred | No swelling |
| Comp. exam. 4 | Basic | 4.30 | Good | 15 | 80 | Not occurred | Swelling |
| Comp. exam. 5 | Basic | 2.30 | Good | 15 | 88 | Not occurred | Swelling |
| Comp. exam. 6 | Basic | 0.25 | Poor | 15 | 74 | Occurred | No swelling |
| Comp. exam. 7 | Basic | 0.42 | Good | 15 | 76 | Occurred | No swelling |
| Comp. exam. 8 | Basic | 2.56 | Good | 15 | 68 | Occurred | Swelling |

From Table 1, it is obvious that in Examples 1 to 22 using the mixtures containing the basic inorganic particles, favorable HF adsorption capacity is exhibited even in the presence of electrolyte salts, the retention rate of the discharge capacity in connection with the life characteristics is as high as 94% or even more, and the micro short circuit does not occur. Furthermore, it is obvious that the cells in which gas is less likely to be generated can be manufactured, and not only battery characteristics but also shape retention were achieved. As a result, it is obvious that the life characteristics and safety are excellent and compatible. In particular, when the elements that are included in "Be, Mg or alkaline-earth metals", such as Mg and Ca are contained, it is obvious that the retention rate of the discharge capacity is maintained high. The results may be presumably explained from that HF in the battery can be more efficiently adsorbed. Furthermore, the retention rate of discharge capacity tends to be slightly increased in the Examples containing a transition metal or a typical metal, compared with the Examples not containing these metals. Moreover, when other inorganic particles are mixed, the retention rate of discharge capacity is increased for each case, and thereby it is conjectured that HF is effectively adsorbed. On the other hand, in Comparative Examples 1 to 8, it was found that the life characteristics and the retention rate of discharge capacity in the presence of the electrolytic salts are inferior, and the micro short circuit is prone to occur easily. When the hydrophilic parameter A of the basic inorganic particles is in an inappropriate range, it is obvious that the retention rate of discharge capacity is hardly maintained or battery swelling occasionally occurs. Particularly in Comparative Example 7, when the battery was disassembled to observe the separator, it was found that the particles partially disappeared. For this reason, it is conjectured that the resistance to the micro short circuit was deteriorated, and the discharge capacity became hard to be retained.

INDUSTRIAL APPLICABILITY

The nonaqueous electrolyte secondary battery according to the present embodiment may be used as power sources for various consumer appliances, power sources for automobiles, etc.

The invention claimed is:

1. Inorganic particles for a nonaqueous electrolyte battery, comprising basic inorganic particles, wherein a hydrophilic parameter A of the basic inorganic particles satisfies 0.45≤A (BET1/BET2)≤2.0, where BET1 is a specific surface area of the basic inorganic particles calculated by an adsorption isotherm measured by adsorbing water vapor to the basic inorganic particles according to a BET method, and BET2 is a specific surface area of the basic inorganic particles calculated by an adsorption isotherm measured by adsorbing nitrogen to the basic inorganic particles according to a BET method.

2. The inorganic particles for a nonaqueous electrolyte battery according to claim 1, wherein a HF concentration decreases to less than 90% of an initial HF concentration in 5 minutes at 23° C. after adding the basic inorganic particles into 100 parts by weight of a cyclic and/or a linear carbonate solution having the HF concentration of 10 to 10,000 ppm and containing 0.1 to 6.0 mol/L of $LiPF_6$ such that an amount of the basic inorganic particles is [HF concentration (ppm)]/100 parts by weight.

3. The inorganic particles for a nonaqueous electrolyte battery according to claim 1, wherein the basic inorganic particles comprise an element of Be, Mg, and/or an element belonging to an alkaline-earth metal.

4. The inorganic particles for a nonaqueous electrolyte battery according to claim 1, wherein the basic inorganic particles further comprise an element belonging to a transition metal.

5. The inorganic particles for a nonaqueous electrolyte battery according to claim 1, further comprising non-basic inorganic particles.

6. The inorganic particles for a nonaqueous electrolyte battery according to claim 5, wherein the non-basic inorganic particles are an anion adsorbent and/or a cation adsorbent.

7. The inorganic particles for a nonaqueous electrolyte battery according to claim 6, wherein the anion adsorbent is a Mg—Al, Mg—Fe, Ni—Fe, or Li—Al layered double hydroxide, a layered double hydroxide-alumina silica gel complex, boehmite, alumina, zinc oxide, lead oxide, iron oxide, iron oxyhydroxide, hematite, bismuth oxide, tin oxide, titanium oxide, or zirconium oxide, and the cation adsorbent is zirconium phosphate, titanium phosphate, apatite, titanate, niobate, or niobatetitanate.

8. The inorganic particles for a nonaqueous electrolyte battery according to claim 1, wherein the basic inorganic particles are calcium silicate.

9. The inorganic particles for a nonaqueous electrolyte battery according to claim 8, wherein the calcium silicate is wollastonite or xonotlite.

10. A nonaqueous electrolyte battery comprising a positive electrode, a negative electrode, a separator, a nonaqueous electrolytic solution, and an outer package, wherein the battery comprises the inorganic particles for a nonaqueous electrolyte battery according to claim 1 in the battery.

11. The nonaqueous electrolyte battery according to claim 10, wherein an inorganic particle-containing layer containing the inorganic particles for a nonaqueous electrolyte battery is present between the positive electrode and the negative electrode.

12. A separator for a nonaqueous electrolyte battery comprising the inorganic particles for a nonaqueous electrolyte battery according to claim 1.

13. A separator for a nonaqueous electrolyte battery comprising an inorganic particle-containing layer containing the inorganic particles for a nonaqueous electrolyte battery according to claim 1.

14. A separator for a nonaqueous electrolyte battery comprising an inorganic particle-containing layer containing the inorganic particles for a nonaqueous electrolyte battery according to claim 1 at least on one side of the separator.

15. The separator for a nonaqueous electrolyte battery according to claim 14, further comprising an aqueous polymer in the inorganic particle-containing layer.

16. A paint for a nonaqueous electrolyte battery, comprising the inorganic particles for a nonaqueous electrolyte battery according to claim 1.

17. A resin solid material for a nonaqueous electrolyte battery, comprising the inorganic particles for a nonaqueous electrolyte battery according to claim 1 and a resin.

18. A lithium ion secondary battery comprising a laminated body or a roll of the laminated body, and a nonaqueous electrolyte, wherein a positive electrode, an inorganic particle-containing layer containing the inorganic particles for a nonaqueous electrolyte battery according to claim 1, a separator, and a negative electrode are laminated in this order.

19. The separator for a nonaqueous electrolyte battery according to claim 12, wherein a HF concentration decreases to less than 90% of an initial HF concentration in 5 minutes at 23° C. after putting the separator for a nonaqueous electrolyte battery into 100 parts by weight of a cyclic and/or a linear carbonate solution having a HF concentration of 10 to 10,000 ppm and containing 0.1 to 6.0 mol/L of $LiPF_6$ such that an amount of the basic inorganic particles for a nonaqueous electrolyte solution is [HF concentration (ppm)]/100 parts by weight.

20. The separator for a nonaqueous electrolyte battery according to claim 12, wherein a HF concentration decreases to less than 90% of an initial HF concentration when 10 ml of a nonaqueous electrolyte solution passed through the separator at a speed of 250,000 ml/h/m², such that an amount of the basic inorganic particles contained in the separator is [HF concentration (ppm)]/100 parts by weight with respect to 100 parts by weight of the nonaqueous electrolyte solution, wherein the nonaqueous electrolyte solution is a cyclic and/or a linear carbonate solution having a HF concentration of 10 to 10,000 ppm and containing 0.1 to 6.0 mol/L of $LiPF_6$.

21. The inorganic particles for a nonaqueous electrolyte battery according to claim 5, wherein the basic inorganic particles are selected from the group consisting of calcium silicate, basic zirconium phosphate, basic apatite, potassium silicotitanate and basic mica.

22. The inorganic particles for a nonaqueous electrolyte battery according to claim 21, wherein the non-basic inorganic particles comprise alumina or boehmite.

23. The inorganic particles for a nonaqueous electrolyte battery according to claim 1, wherein the basic inorganic particles further comprise an element selected from the group consisting of Al, Zn, Ga, Cd, In, Sn, Hg, Tl, Pb, and Bi.

* * * * *